United States Patent
Khan et al.

(10) Patent No.: US 11,250,414 B2
(45) Date of Patent: Feb. 15, 2022

(54) CLOUD BASED SYSTEM FOR ENGAGING SHOPPERS AT OR NEAR PHYSICAL STORES

(71) Applicant: Omnyway, Inc., San Mateo, CA (US)

(72) Inventors: Mohammad Anwar Khan, San Jose, CA (US); Ashok Narasimhan, San Francisco, CA (US); Laura Ann Torbett Giddings, Los Gatos, CA (US); Amitaabh Malhotra, San Carlos, CA (US); Robert Jay Berger, Saratoga, CA (US); Sriram Krishnan, San Jose, CA (US)

(73) Assignee: Omnyway, Inc., San Mateo, CA (US)

( * ) Notice: Subject to any disclaimer, the term of this patent is extended or adjusted under 35 U.S.C. 154(b) by 0 days.

(21) Appl. No.: 16/983,901

(22) Filed: Aug. 3, 2020

(65) Prior Publication Data
US 2021/0035086 A1 Feb. 4, 2021

Related U.S. Application Data

(60) Provisional application No. 62/882,394, filed on Aug. 2, 2019.

(51) Int. Cl.
*G06Q 20/02* (2012.01)
*G06Q 20/32* (2012.01)
(Continued)

(52) U.S. Cl.
CPC ....... *G06Q 20/3276* (2013.01); *G06Q 20/204* (2013.01); *G06Q 20/3223* (2013.01); *G06Q 20/384* (2020.05)

(58) Field of Classification Search
None
See application file for complete search history.

(56) References Cited

U.S. PATENT DOCUMENTS

| 6,324,525 B1 | 11/2001 | Kramer et al. |
| 7,483,858 B2 | 1/2009 | Foran et al. |

(Continued)

FOREIGN PATENT DOCUMENTS

| EP | 0708547 A2 | 4/1996 |
| EP | 2747016 A2 | 6/2014 |

(Continued)

OTHER PUBLICATIONS

Nguyen, Judy, "An Analysis and Comparison of E-Commerce Transaction Protocols—Purchasing Order," A Survey Paper for the completion of CMPE 298, Summer 1999, SJSU, 66 pages.

(Continued)

*Primary Examiner* — Joseph W. King
(74) *Attorney, Agent, or Firm* — Lowenstein Sandler LLP

(57) ABSTRACT

A system for facilitating payment and non-payment transactions between a computing device that lacks an activated payment application and a merchant is described. In an embodiment, a transaction bridge server receives, from a merchant server, transaction information for a particular transaction between a user and a merchant. The transaction bridge server generates a URL representing the particular transaction, sends the URL to the merchant server, and receives, from a web browser of a computing device, an indication of an interaction between the computing device and a touchpoint comprising the URL, the indication comprising a request to access the URL. The transaction bridge server generates a display page customized for the user, the display page comprising the transaction information, sends the display page to the web browser of the computing device, receives an acceptance of the particular transaction, and initiates the particular transaction.

10 Claims, 24 Drawing Sheets

(51) Int. Cl.
    *G06Q 20/38* (2012.01)
    *G06Q 20/20* (2012.01)

(56) References Cited

U.S. PATENT DOCUMENTS

| | | | |
|---|---|---|---|
| 8,620,754 | B2 | 1/2013 | Fisher |
| 8,380,177 | B2 | 2/2013 | Laracey |
| 8,417,633 | B1 | 4/2013 | Chmara |
| 8,516,562 | B2 | 8/2013 | Headley |
| 8,632,000 | B2 | 1/2014 | Laracey |
| 8,677,116 | B1 | 3/2014 | Bicer |
| 8,849,705 | B2 | 9/2014 | Khan et al. |
| 8,965,800 | B2 | 2/2015 | Soysa et al. |
| 9,009,468 | B1 | 4/2015 | Zayed |
| 9,082,119 | B2 | 7/2015 | Ortiz et al. |
| 9,183,549 | B2 | 11/2015 | Kapur et al. |
| 9,208,482 | B2 | 12/2015 | Laracey |
| 9,305,295 | B2 | 4/2016 | Laracey |
| 9,430,796 | B1 | 8/2016 | So |
| 2001/0032192 | A1 | 10/2001 | Putta et al. |
| 2002/0029342 | A1 | 3/2002 | Keech |
| 2002/0065774 | A1 | 5/2002 | Young et al. |
| 2002/0152123 | A1 | 10/2002 | Giordano et al. |
| 2002/0169984 | A1 | 11/2002 | Kumar et al. |
| 2003/0055792 | A1 | 3/2003 | Kinoshita et al. |
| 2003/0065805 | A1 | 4/2003 | Barnes |
| 2004/0019564 | A1 | 1/2004 | Goldthwaite et al. |
| 2004/0097217 | A1 | 5/2004 | McClain |
| 2004/0107146 | A1 | 6/2004 | Alfano |
| 2004/0128517 | A1 | 7/2004 | Drews et al. |
| 2005/0096011 | A1 | 5/2005 | Koshida et al. |
| 2005/0187873 | A1 | 8/2005 | Labrou et al. |
| 2005/0250538 | A1 | 11/2005 | Narasimhan et al. |
| 2006/0006224 | A1 | 1/2006 | Modi |
| 2006/0036485 | A1 | 2/2006 | Duri et al. |
| 2006/0180661 | A1 | 8/2006 | Grant et al. |
| 2006/0218091 | A1 | 9/2006 | Choy |
| 2007/0244746 | A1 | 10/2007 | Issen et al. |
| 2008/0004951 | A1 | 1/2008 | Huang et al. |
| 2008/0010190 | A1 | 1/2008 | Rackley, III et al. |
| 2009/0313134 | A1 | 12/2009 | Faith et al. |
| 2010/0030687 | A1 | 2/2010 | Panthaki et al. |
| 2010/0252624 | A1 | 10/2010 | Van de Velde et al. |
| 2010/0287057 | A1 | 11/2010 | Aihara et al. |
| 2010/0320266 | A1 | 12/2010 | White |
| 2011/0106635 | A1 | 5/2011 | Khan et al. |
| 2011/0137742 | A1 | 6/2011 | Parikh |
| 2011/0251910 | A1 | 10/2011 | Dimmick |
| 2011/0270751 | A1 | 11/2011 | Csinger et al. |
| 2011/0307318 | A1 | 12/2011 | LaPorte et al. |
| 2011/0320291 | A1 | 12/2011 | Coon |
| 2012/0078792 | A1 | 3/2012 | Bacastow et al. |
| 2012/0136739 | A1 | 5/2012 | Chung |
| 2012/0143752 | A1 | 6/2012 | Wong et al. |
| 2012/0203605 | A1 | 8/2012 | Morgan et al. |
| 2012/0203696 | A1 | 8/2012 | Morgan et al. |
| 2012/0209749 | A1 | 8/2012 | Hammad et al. |
| 2012/0253913 | A1 | 10/2012 | Richard |
| 2012/0265685 | A1 | 10/2012 | Brudnicki et al. |
| 2012/0290421 | A1 | 11/2012 | Qawami et al. |
| 2012/0296725 | A1 | 11/2012 | Dessert et al. |
| 2013/0006776 | A1 | 1/2013 | Miller et al. |
| 2013/0013499 | A1 | 1/2013 | Kalgi |
| 2013/0013502 | A1 | 1/2013 | Purvis |
| 2013/0013507 | A1 | 1/2013 | Browning et al. |
| 2013/0054413 | A1 | 2/2013 | Brendell et al. |
| 2013/0080329 | A1 | 3/2013 | Royyuru |
| 2013/0124413 | A1 | 5/2013 | Itwaru |
| 2013/0138518 | A1 | 5/2013 | White et al. |
| 2013/0144690 | A1 | 6/2013 | White et al. |
| 2013/0159186 | A1 | 6/2013 | Brudnicki et al. |
| 2013/0191174 | A1 | 7/2013 | Zhou et al. |
| 2013/0212019 | A1 | 8/2013 | Mattsson et al. |
| 2013/0238455 | A1 | 9/2013 | Laracey |
| 2013/0238456 | A1 | 9/2013 | Soysa et al. |
| 2013/0246203 | A1 | 9/2013 | Laracey |
| 2013/0256403 | A1 | 10/2013 | MacKinnon Keith |
| 2013/0275307 | A1 | 10/2013 | Khan |
| 2013/0275308 | A1 | 10/2013 | Paraskeva et al. |
| 2013/0311313 | A1 | 11/2013 | Laracey |
| 2013/0311375 | A1 | 11/2013 | Priebatsch |
| 2013/0311382 | A1 | 11/2013 | Fosmark et al. |
| 2013/0317928 | A1 | 11/2013 | Laracey |
| 2013/0325569 | A1 | 12/2013 | Holmes et al. |
| 2014/0025391 | A1 | 1/2014 | Knowles et al. |
| 2014/0040139 | A1 | 2/2014 | Brudnicki et al. |
| 2014/0058862 | A1 | 2/2014 | Celkonas |
| 2014/0108252 | A1 | 4/2014 | Itwaru et al. |
| 2014/0108263 | A1 | 4/2014 | Ortiz et al. |
| 2014/0136353 | A1 | 5/2014 | Goldman et al. |
| 2014/0149293 | A1 | 5/2014 | Laracey |
| 2014/0164237 | A1 | 6/2014 | Blanco et al. |
| 2014/0188701 | A1 | 7/2014 | Shreedhararaj et al. |
| 2014/0214619 | A1 | 7/2014 | Cancro et al. |
| 2014/0278965 | A1 | 9/2014 | Douglas et al. |
| 2015/0039452 | A1 | 2/2015 | Barve et al. |
| 2015/0058300 | A1 | 2/2015 | Perczynski et al. |
| 2015/0073926 | A1 | 3/2015 | Royyuru et al. |
| 2015/0120475 | A1 | 4/2015 | Pedley et al. |
| 2015/0142604 | A1 | 5/2015 | Kneen |
| 2015/0149308 | A1 | 5/2015 | Lin |
| 2015/0178732 | A1 | 6/2015 | Laracey |
| 2015/0180836 | A1 | 6/2015 | Wong |
| 2015/0186871 | A1 | 7/2015 | Laracey |
| 2015/0248664 | A1 | 9/2015 | Makhdumi et al. |
| 2015/0269579 | A1 | 9/2015 | Subramanian et al. |
| 2015/0287037 | A1 | 10/2015 | Salmon et al. |
| 2015/0379615 | A1 | 12/2015 | Dhar et al. |
| 2016/0071094 | A1 | 3/2016 | Krishnaiah et al. |
| 2016/0071115 | A1 | 3/2016 | Oh et al. |
| 2016/0155145 | A1 | 6/2016 | Katz et al. |
| 2016/0225063 | A1 | 8/2016 | Wical |
| 2016/0300237 | A1 | 10/2016 | Khan et al. |
| 2016/0342991 | A1 | 11/2016 | Narasimhan et al. |
| 2016/0350745 | A1 | 12/2016 | Wilkes |
| 2017/0024742 | A1 | 1/2017 | Khan et al. |
| 2017/0053301 | A1 | 2/2017 | Khan et al. |
| 2017/0287018 | A1 | 10/2017 | Narasimhan et al. |
| 2018/0225666 | A1 | 8/2018 | Khan et al. |
| 2018/0247287 | A1 | 8/2018 | Narasimhan et al. |
| 2018/0247289 | A1 | 8/2018 | Narasimhan et al. |
| 2018/0247298 | A1 | 8/2018 | Narasimhan et al. |
| 2018/0253718 | A1 | 9/2018 | Khan et al. |
| 2018/0260833 | A1 | 9/2018 | Khan et al. |
| 2018/0300754 | A1 | 10/2018 | Narasimhan et al. |
| 2019/0026723 | A1 | 1/2019 | Narasimhan et al. |
| 2020/0065779 | A1* | 2/2020 | Azar .............. G06Q 20/027 |

FOREIGN PATENT DOCUMENTS

| | | |
|---|---|---|
| EP | 2905735 A1 | 8/2015 |
| JP | 2007299316 A | 11/2007 |
| KR | 020050045644 A | 5/2005 |
| WO | 0042593 A1 | 7/2000 |
| WO | 02097575 A2 | 12/2002 |
| WO | 2012151660 A1 | 11/2012 |
| WO | 2012158057 A1 | 11/2012 |
| WO | 2013023499 A1 | 2/2013 |
| WO | 2013066910 A1 | 5/2013 |
| WO | 2013115700 A2 | 8/2013 |
| WO | 2014128351 A1 | 8/2014 |
| WO | 2014164647 A1 | 10/2014 |
| WO | 2015017488 A1 | 2/2015 |
| WO | 2015039254 A1 | 3/2015 |
| WO | 2015058300 A1 | 4/2015 |
| WO | 2015095517 A1 | 6/2015 |
| WO | 2015157403 A1 | 10/2015 |
| WO | 2016164648 A1 | 10/2016 |
| WO | 2016183508 A1 | 11/2016 |
| WO | 2016191325 A1 | 12/2016 |
| WO | 2017023757 A1 | 2/2017 |
| WO | 2017030608 A1 | 2/2017 |
| WO | 2017031469 A1 | 2/2017 |
| WO | 2017031481 A1 | 2/2017 |

(56) References Cited

FOREIGN PATENT DOCUMENTS

| WO | 2017044642 A1 | 3/2017 |
|----|---------------|--------|
| WO | 2017044981 A1 | 3/2017 |
| WO | 2017054011 A1 | 3/2017 |
| WO | 2019010376 A1 | 1/2019 |
| WO | 2019035065 A1 | 2/2019 |

OTHER PUBLICATIONS

International Search Report and Written Opinion for International Patent Application No. PCT/US2016/054028, dated Jan. 16, 2017, 12 pages.
International Search Report and Written Opinion for International Patent Application No. PCT/US2016/047930, dated Nov. 23, 2016, 13 pages.
International Search Report and Written Opinion for International Patent Application No. PCT/US2016/051386, dated Dec. 13, 2016, 11 pages.
International Search Report and Written Opinion for International Patent Application No. PCT/US2016/033675, dated Jul. 21, 2016, 10 pages.
International Search Report and Written Opinion for International Patent Application No. PCT/US2016/026531, dated Jun. 29, 2016, 11 pages.
International Search Report and Written Opinion for International Patent Application No. PCT/US2016/021798, dated Jun. 1, 20016, 13 pages.
International Search Report and Written Opinion for International Patent Application No. PCT/US2018/041025, dated Sep. 19, 2018, 19 pages.
International Search Report and Written Opinion for International Patent Application No. PCT/IB2018/056209, dated Nov. 9, 2018, 13 pages.
International Search Report and Written Opinion for International Patent Application No. PCT/US2016/032509, dated Oct. 4, 2016, 12 pages.
International Search Report and Written Opinion for International Patent Application No. PCT/US2016/044725, dated Sep. 16, 2016, 11 pages.
International Search Report and Written Opinion for International Patent Application No. PCT/US2016/050800, dated Oct. 21, 2016, 10 pages.
International Search Report and Written Opinion for International Patent Application No. PCT/US2016/047898, dated Nov. 3, 2016, 10 pages.
International Search Report and Written Opinion for International Patent Application No. PCT/US2016/046916, dated Dec. 6, 2019, 12 pages.
Decision on Appeal for U.S. Appl. No. 14/986,592, dated Aug. 23, 2019; 38 pages.
Examination Report for European Patent Application No. 16781927.5, dated Feb. 22, 2019, 7 pages.
Examination Report for European Patent Application No. 16736279.7, dated Feb. 11, 2019, 7 pages.
Examination Report No. 1 for Australian Patent Application No. 2016244847, dated Nov. 20, 2018, 5 pages.
Examination Report for European Patent Application No. 16717071.1, dated Nov. 26, 2019, 8 pages.
Examination Report for European Patent Application No. 16710638.4, dated Mar. 20, 2020, 8 pages.

\* cited by examiner

CLOUD BASED SYSTEM FOR ENGAGING SHOPPERS AT OR NEAR PHYSICAL STORES

RELATED APPLICATIONS

This patent application claims the benefit under 35 U.S.C. § 119(e) of U.S. Provisional Application No. 62/882,394, filed Aug. 2, 2019, which is incorporated by reference herein. This application is additionally related to PCT Patent Application No. PCT/US2019/046916, filed Aug. 16, 2019, which is incorporated by reference herein.

FIELD OF THE DISCLOSURE

The present disclosure relates to methods and systems for merchants or service providers to engage shoppers in or near their physical stores using cloud based apps, without requiring their shoppers to download a specific mobile app.

BACKGROUND OF THE INVENTION

Retailers, payment instrument (card, account, etc.) issuers, payment service/wallet providers and financial Institutions (banks, Fintech) require a payment app to enable their shoppers to make in-store purchases at their physical stores using their mobile devices or other devices.

This is a problem as this requires shoppers to either download or activate their respective mobile app (e.g., Kohl's App for Kohl's, PayPal App, etc.), or activate device resident payment utilities like Apple Pay, Samsung Pay, Google Pay, or others in their mobile devices. This extra effort required is limiting shoppers' (consumers or businesses) adoption to use their mobile devices with specific application(s) to redeem coupons/offers, make in-store purchases, engage in in-store checkout, and/or make in-store payments.

This is not only a challenge for large retailers and other service providers, but also a much bigger challenge for millions of mid- to small-size merchants.

Equally, it is a big challenge for shoppers to manage dozens of different merchant mobile applications or various payment wallets, or other apps.

Thus, there is a need for merchants or service providers to engage shoppers in or near their physical stores using cloud based apps only, without requiring their shoppers to download a specific mobile app.

DETAILED DESCRIPTION

The embodiments set forth below represent the information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Methods and systems for merchants or service providers to engage shoppers in or near their physical stores using cloud based apps, without requiring their shoppers to download a specific mobile app, are presented herein. For example, merchants or service providers are able to engage shoppers in or near their physical stores using cloud based apps only in embodiments. Computing devices including mobile computing devices (e.g., such as mobile smart phones, smart watches, tablet computers, etc.) and traditionally stationary computing devices (e.g., such as desktop computers) may be used to make purchases with one or a single click of a button and without any mobile payment application or other payment application having been activated on the computing device.

The proposed solution will allow shoppers to make purchases by interacting with a touchpoint (which may be associated with a particular transaction and/or may have been generated specifically for a particular transaction). The touchpoint may be a machine readable optical label (e.g., such as a Quick Response (QR) code, a product Universal Product Code (UPC) code, a product Stock Keeping Unit (SKU) #), a radio-frequency readable passive or active device (e.g., a near-field communication) NFC tag, an NFC enabled computing or point-of-sale (POS) device, a radio-frequency identification (RFID) tag, an RFID enabled computing or POS device, or a Bluetooth® enabled computing device or merchant POS device), a product offer, a product coupon, a product promotion, a product image, an email message containing product information and/or a uniform resource locator (URL) link, a text message containing product information and/or a URL link, a message posted to a social media account of a user that includes product information and/or a URL link, a message posted on a web page to a user that includes product information and/or a URL link, or any other specific image (defined for such purpose) using a shopper device camera, and without downloading any app or prior activation of any device resident utility. A product could be one or more items, or one or more services.

Figure 1A:
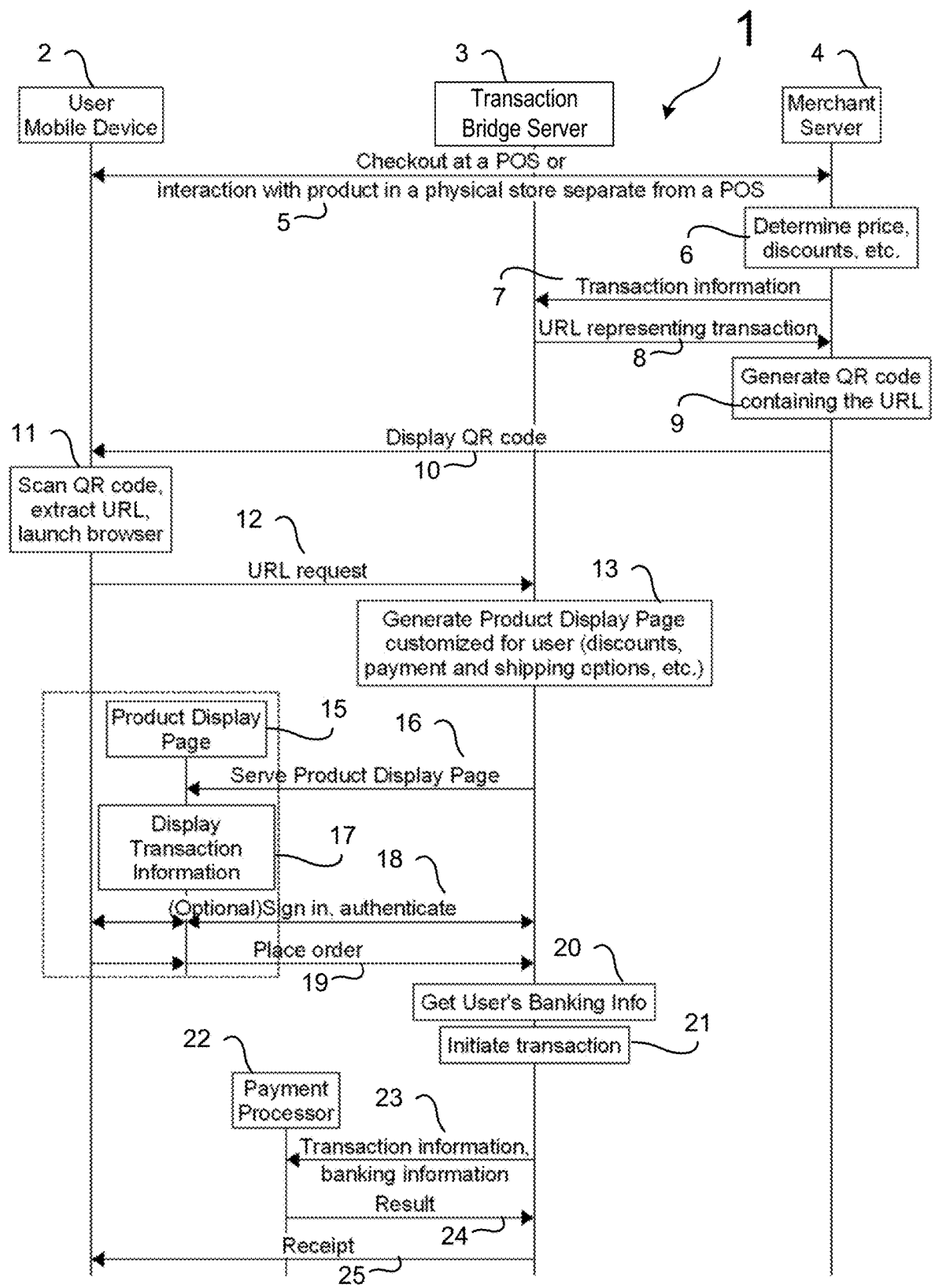
FIG. 1A illustrates an example process according to some embodiments of the present disclosure.

FIG. 1A illustrates an example process 1 according to some embodiments of the present disclosure. A shopper using any mobile computing device (iOS, Android, Windows devices, wearables, etc.) 2 can interact with a touchpoint in order to perform a payment transaction or non-payment transaction without any mobile payment application installed and/or activated on the mobile computing device. Note that in alternative embodiments a user may use a traditionally stationary computing device rather than a mobile computing device. Such embodiments may not take place at a physical location of a merchant however.

The touchpoint may include or pass a touchpoint value, which may include a universal resource locator (URL) and/or additional information such as a point of sale or point of transaction location information. The touchpoint may be a unique touchpoint including a unique touchpoint value that was generated specifically for a particular transaction between the user (or mobile device of the user) and the merchant (or other third party). Alternatively, the touchpoint may be a static touchpoint that includes a static touchpoint value that is the same across multiple transactions. The touchpoint value could represent a single transaction or multiple transactions (e.g., purchase of a single item or purchase of multiple different items). The touchpoint value may stay the same across multiple transactions (e.g., if a QR code is printed and posted near a PoS, a passive NFC tag is used that doesn't change in value, etc.), or a touchpoint value may change every transaction (e.g., a unique QR code may be displayed on a customer facing screen on a POS system/terminal, a NFC PoS terminal could give a dynamic value, etc.) In some embodiments, a URL could also change across different touchpoint values based on a transaction type involved by the merchant POS.

In an example, a camera of the mobile computing device may scan a machine readable optical label such as a QR code or barcode, or any other specific image at a merchant Point of Sale (POS), on a product, or any in-store digital checkout post, and be able to do in-store coupon/offer/value redemption, in-store purchase, in-store checkout, and/or in-store payments. In another example, the camera of the mobile computing device may scan a machine readable optical label at a doctor's office in order to initiate a non-payment transaction, such as checking in a patient and/or a payment transaction, such as making a copayment associated with a doctor visit. For QR codes, for example, static QR codes (printed and posted at/near POS or any in-store digital checkout post) or dynamic QR codes (displayed by the POS or any customer facing display) may be supported.

In alternative embodiments, a shopper device could also read a barcode, an Near Field Communications (NFC) contactless passive tag (i.e., normally, with a static value) or NFC contactless active device, a Bluetooth device, a UPC code, a SKU #, a graphic or character based message, an audio sound or message, or a photo image, containing an Uniform Resource Locator (URL) address itself, or an alpha-numerical, or graphical code corresponding to the relevant cloud application(s). Each of these examples is considered to be different possibilities for interactions of the mobile computing device with a touchpoint. In an example, the touchpoint may be or include a machine-readable radio-frequency device (e.g., such as an NFC device, a Bluetooth device, an RFID, and so on), and interacting with the touchpoint by the mobile computing device includes reading the machine-readable radio-frequency device using a radio frequency reader of the mobile computing device.

Once the mobile computing device interacts with the touchpoint (e.g., a QR code or other image is scanned at in-store POS or at any digital checkout post by a user/shopper mobile device 2 scanning a product), the mobile computing device receives or determines a touchpoint value via the interaction. As mentioned above, the touchpoint value may include a URL and/or other information. In some examples, the mobile computing device may extract the URL and/or other information from the touchpoint value (e.g., from a signal read or received from the touchpoint that contains the touchpoint value, such as by extracting the URL and/or other information from the signal). In an example, a web based offer HTML page or other display page (e.g., a Product Display Page [PDP]) will be displayed to the shopper along with the purchasing order detail (list of one or more products being purchased, in the example of a payment transaction), sales tax information, and/or the total transaction amount, payment information, shopper name/address/phone number and an option to ship or in-store pick up (default) option, and the shopper could just press a button to complete a purchase. The display page may include the transaction information. The display page may include, but not be limited to, text, one or more images, a video, a video stream, one or more URL links, one or more customer interaction options and/or customer selection options (e.g., optionally presented as buttons, including but not limited to a Pay Button, a Buy Button and/or a Place Order Button), and so on. The display page may include payment information (e.g., a cost for a transaction, an account that will be charged, any discounts, and so on) as well as non-payment information (e.g., a shipping address, a billing address, and so on).

In one embodiment, payment platform servers 3 will be activated through the URL or a corresponding code read through the interaction with the touchpoint (e.g., through the QR code) along with the POS/Checkout location address (both information contained in the QR code), a default browser will be launched on the user/shopper/consumer mobile device 2—with wallet display page (to pay/checkout only), product display page (with product information to choose or buy), or purchasing order display page (all products shown to purchase with one Click) created by the transaction bridge 3. Where, product(s) to buy information, shopper name/email/shipping information, and payment information will be in the cloud managed by the payment platform server 3, and may display on the shopper mobile device 2.

Upon interacting with the touchpoint (e.g., scanning the QR code) and seeing a display page from a transaction bridge 3, the shopper may take different actions depending on the shopper's status.

A first time shopper may click on a payment, loyalty, promotion, purchase, and/or other "call to action" button on the display page, and could sign in using his/her phone # or email address, by entering a username, and/or by entering a password and/or responding to device based authentication (e.g., finger print, face recognition, behavioral). It could be a similar purchasing or other transaction experience as set forth in PCT Patent Application No. PCT/US2019/046916, filed Aug. 16, 2019, which is incorporated by reference herein.

A returning shopper can just press a place order or accept a service (loyalty, promotion, banking, entertainment, etc.) button to complete a purchase, a non-purchase transaction, or any engagement. All of the personal data, shipping data, loyalty/promotion/offers data, payment data, preferences data, behavioral data, purchasing history, receipts, etc., will be managed in the cloud by payment platform servers 3 on behalf of retailers based—per merchant cloud app, and/or a multi-merchant cloud apps. Accordingly, no sensitive information such as banking information (e.g., credit card numbers) is sent from the mobile computing device to any other device (e.g., to the merchant server) in embodiments. This can improve a security of transactions.

Once again, the triggering point or touchpoint could be a QR code, a barcode, an NFC tag/device, a Bluetooth device, an audio sound device, a photo of an image, or other proximity technologies (e.g., of a touch display, an internet of things (IoT) device, a wearable device, etc.) on a consumer mobile device 2 itself responding to an application or a browser displayed image or ad or promotion/offer/coupon (e.g., on a social network web site or in a social network application, etc.), where triggering could also involve receiving embedded information like a uniform resource locator (URL), shopper data, point of sale (POS) data, point of interaction location data, and/or other relevant data. The social network may be, for example, Facebook®, Instagram®, SnapChat®, Pinstripe®, TikTok®, Twitter®, WeChat®, AliPa®, PayTM®, Twitch®, or another social media network.

A shopper could be in a physical merchant store, near a store, in a mall/shopping strip, or anywhere else (theater, stadium/arena, home, at work, restaurant, online, etc.). A shopper could be driven/motivated to visit a physical location (e.g., a merchant store, a department of a store, an aisle in a store, or a production location in a store, or any other location) through a social network, an advertisement (ad), or a promotion, or a directive, or one's own will.

This concept of not requiring any mobile payment application (app) to do a transaction or any other device user engagement with various services is applicable for not only purchases, but also for various customer engagement applications in consumer or business services environments, entertainment, transportation, banking, insurance, government services, and so on where service information, personal information, address information, and/or payment information could be populated through a cloud based server like the payment platform servers 3.

In the example shown in FIG. 1A, user mobile device 2 engages with a merchant server 4 (which may be operated by a merchant directly, by an operator of the transaction bridge server (e.g., may be digital commerce platform server representing the merchant such as an Omnyway® commerce server), by a $3^{rd}$ party, or by a marketplace on behalf of a merchant), and transaction bridge (e.g., an Omnyway® platform server) 3 facilitates such engagement. For example, the user device 2 at step 5 may checkout at a POS or have interaction with a product in a physical store associated with the merchant server 4, wherein the physical store may be separate from a POS.

At step 6, the merchant server 4 determines a price, discounts, and/or other transaction information. At step 7, the merchant server 4 sends the transaction information for the particular transaction to the transaction bridge 3. At step 8, the transaction bridge 3 determines or generates A URL representing the transaction (e.g., creates a web page and/or the URL), and sends the URL representing the transaction back to the merchant server 4.

At step 9, the merchant server 4 generates a touchpoint (e.g., a QR code) containing the URL. At step 10, the merchant server 4 provides the touchpoint to the mobile device 2 (e.g., displays the QR code to the user mobile device 2). At step 11, the user mobile device 2 interacts with the touchpoint (e.g., scans the QR code using a camera of the mobile device 2), determines the URL based on the interaction with the touchpoint (e.g., extracts the URL from the QR code and/or decodes the QR code to determine the URL), and launches a browser on the user mobile device 2.

At step 12, the mobile device 2 sends an indication of an interaction between the mobile device 2 and the touchpoint to the transaction bridge server 3. The touchpoint may have passed a touchpoint value including a URL as well as additional information such as POS location information. The touchpoint value could represent a transaction. Alternatively, the touchpoint value may be the same across multiple transactions (e.g., if a QR code is printed and posted near a POS), of the touchpoint value may change every transaction (e.g., if a QR code is displayed on a customer facing screen on a POS system/terminal). In this case, the URL in the touchpoint value could also change based on the transaction type involved by the merchant POS. Accordingly, the indication may include a request to access the URL representing the particular transaction (e.g., where the URL may be a unique URL associated with the particular transaction in the case where the touchpoint value was unique to the particular transaction) or may include a request to access a URL that may also be used for other transactions (e.g., in the case where the touchpoint value is static and used for multiple transactions). For example, the mobile device 2 may sent a URL request to the transaction bridge server 3. At step 13, the transaction bridge server 3 generates a display page (e.g., a product display page) customized for the user (e.g., with discounts, payment information, shipping information, etc. customized for the user). The display page may be generated responsive to receiving the indication of the interaction between the mobile device 2 and the touchpoint in embodiments. The customized information may be determined based on a user account and/or profile for the user maintained by the transaction bridge server 3. Alternatively, the product display page may already have been generated by the transaction bridge server 3.

The user mobile device 2 may interact with the product display page 15 to perform a transaction (e.g., a purchase transaction). At step 16 the transaction bridge server 3 serves or sends the display page (e.g., the product display page 15) to the mobile device 2 (e.g., to the web browser of the mobile device 2). At step 17 the product display page 15 displays the transaction information on the user mobile device 2. At step 18 the user device 2 optionally signs in and/or authenticates to the product display page 15, which may ultimately include sign in and/or authenticating to an account on the transaction bridge server 3. In embodiments, the user mobile device 2 provides credentials to the product display page 15, which are provided to the transaction bridge server 3. The transaction bridge server 3 then authenticates the user (and/or the user mobile device 2). At step 19, the mobile device 2 sends instructions to place an order to the product display page 15, and the instructions are sent to the transaction bridge server 3. The transaction bridge server 3 receives an acceptance of the particular transaction from the mobile device 2.

At step 20, the transaction bridge server retrieves banking information (e.g., credit card information) of the user. At step 21, the transaction bridge server then initiates the transaction. In embodiments, step 20 and the following steps may be included in initiating/performing the transaction.

At step 23, a third party payment processor 22 receives the transaction information and the banking information. The payment processor 22 then executes payment for the transaction, and sends a result to the transaction bridge server 3 at step 24. The transaction bridge server can then send a receipt to the user mobile device 2 and/or to the merchant server 4 at step 25, completing the purchase transaction. The entire transaction shown in FIG. 1A may be performed without the mobile device sending any sensitive information to any computing device (e.g., to merchant server). Instead, the sensitive information such as banking information may be stored by transaction bridge server, which may use such information to interface with a payment processor over a secure connection to perform the financial or payment portion of the transaction.

In the example shown in FIG. 1A, the touchpoint is a type of touchpoint that can be displayed to, transmitted to, or otherwise interacted with by, a mobile device that is at a particular physical location associated with a transaction. However, in other embodiments touchpoints may not have physical constraints. Examples of such touchpoints that lack physical constraints are email messages, text messages and messages posted on social media accounts of users on social media services. A computing device may interface with such touchpoints based on a user clicking on such messages or an image, button or other component of such messages. A computing device may alternatively interact with such touchpoints based on sending a response (e.g., a response email message or text message). Responsive to such interaction with the touchpoint, the steps from step 13 and on set forth above in FIG. 1A may be performed.

Figure 1B:
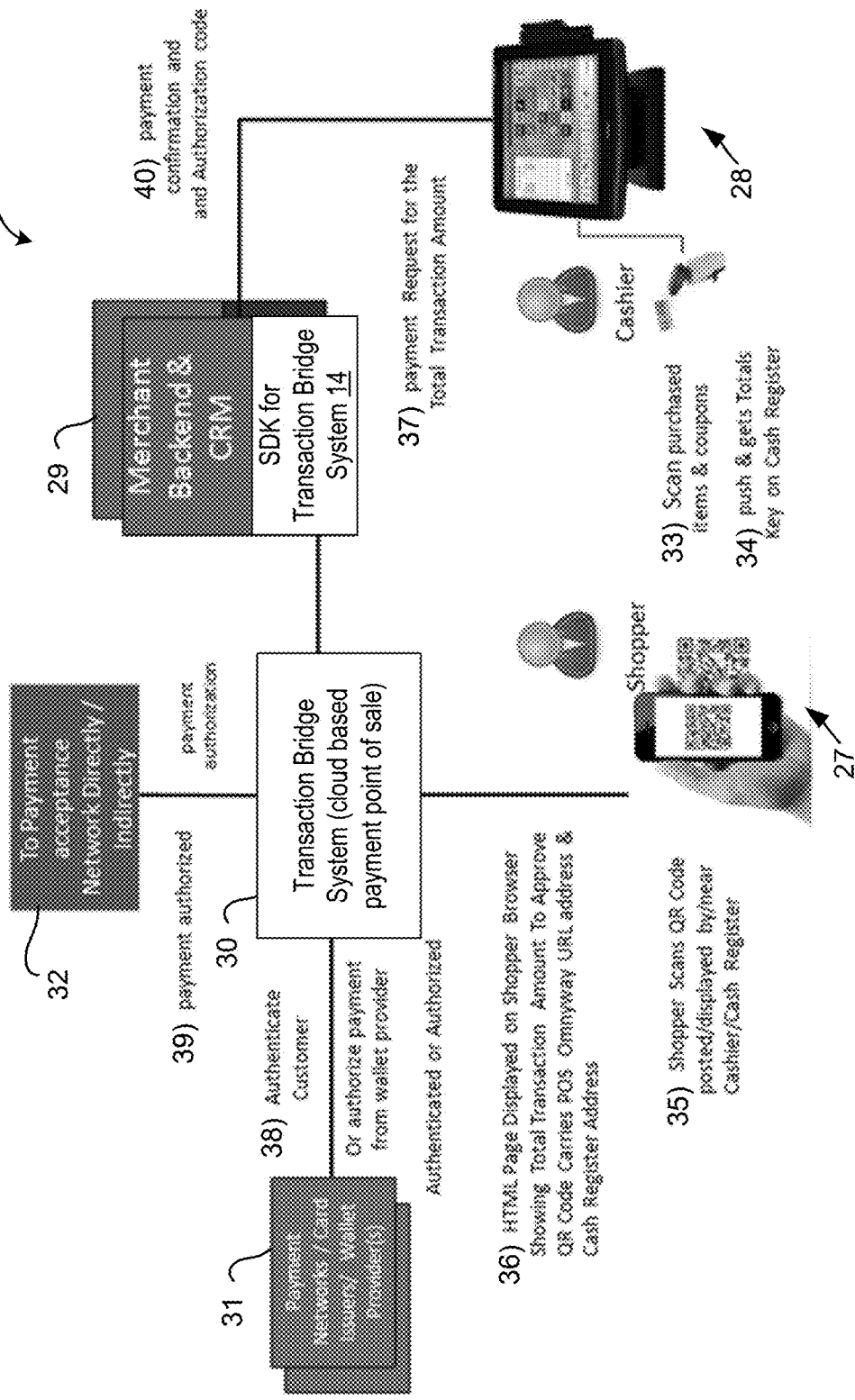
FIG. 1B illustrates an example process according to some other embodiments of the present disclosure, where the shopper is in a physical store interacting with a cashier, e.g., at a checkout counter.

FIG. 1B illustrates an example process for a one step payment transaction 26 according to some other embodiments of the present disclosure, where a shopper is in a physical store interacting with a cashier, e.g., at a checkout counter. In FIG. 1B, a cashier scans purchased items and coupons using the merchant's system 28 (step 33) and, when all items are scanned, hits a "total" key on the cash register or POS terminal (step 34).

The shopper then scans a QR code on his or her mobile device 27 (step 35). The QR code may be provided by the cashier, by the cash register or POS terminal, may be displayed somewhere in the store, etc. The QR code may be statically or dynamically generated. The QR code may contain an address (e.g., URL address) of the transaction bridge system 30, an address (e.g., URL address) of the store, a point of sale (POS) identifier (ID), an identifier that identifies the specific transaction, etc.

The mobile device 27 decodes the QR code, determines that it contains a URL, and loads that URL using a web browser or other equivalent program that comes standard with every mobile device (step 36). For example, the mobile device browser will make a Hypertext Transfer Protocol (HTTP) Request that includes parameters such as POS ID, merchant ID, transaction or session ID, and so on.

At step 36, the transaction bridge system 30 receives the HTTP Request, retrieves transaction information, and displays an HTML page showing transaction information, such as: the total transaction amount to approve; information about the product or products; coupons and incentives available; options for payment instrument (e.g., a list of cards to choose from, with one of them chosen as the default); and so on.

The user then approves the transaction. At step 37, a payment request for the total transaction amount is sent to the merchant backend, and a service developer kit (SDK) 14 installed at the merchant backend 29 sends the payment request on to the transaction bridge system 30.

At step 38, the transaction bridge system optionally authenticates the customer (e.g., with a payment network, card issuer and/or wallet provider 31). At step 39, the payment is authorized by a payment network 32. When the user approves the transaction, the payment is authorized (step 39), and the transaction bridge system 30 server interacts with the merchant backend 29 and/or the payment network 32 to initiate the payment transaction. A payment confirmation and authorization code may then be sent back to the point of sale at step 40. The transaction bridge system server 30 then generates a webpage that includes the transaction receipt, which may be sent to the mobile device 27 of the shopper.

Figure 1C:
FIG. 1C shows a transaction according to the methods and systems of the present disclosure, from the perspective of a user's mobile device, for a user that has completed the in-store checkout process.

FIG. 1C shows a transaction 41 according to the methods and systems of the present disclosure, from the perspective of a user's mobile device, for a user that has completed the in-store checkout process. In FIG. 1C, left image, the shopper scans the QR code (and performs authentication of the user, e.g., by using Touch ID to detect a fingerprint). In the middle image, the shopper is the presented with a generated web page that shows the payment options available to the user, the gift cards available to the user, coupons and offers for the user, the total amount of the transaction, and a "Proceed" button. If the user hits the "Proceed" button, the transaction is performed. The right image of FIG. 1C shows the receipt that is generated in response to a successful transaction.

Figure 1D:
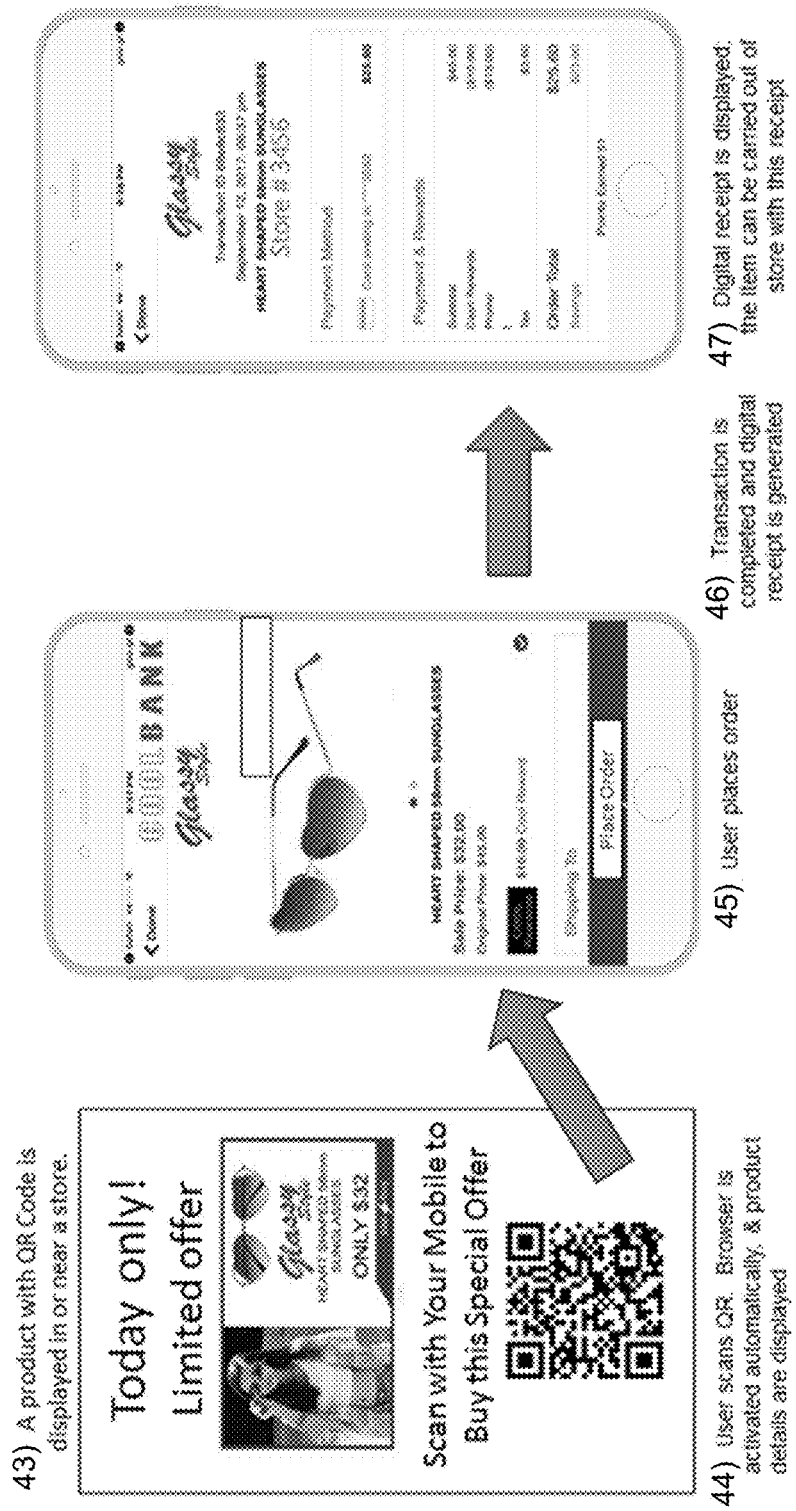
FIG. 1D shows a transaction according to the methods and systems of the present disclosure, from the perspective of a user's mobile device, for a user that has not performed the checkout process but has instead noticed a product displayed within the store, for example, of outside of a store, e.g., at a kiosk.

FIG. 1D shows a transaction 42 according to the methods and systems of the present disclosure, from the perspective of a user's mobile device, for a user that has not performed the checkout process but has instead noticed a product displayed within the store, for example, of outside of a store, e.g., at a kiosk. In FIG. 1D, the user sees a display showing glasses on sale and a QR code, shown in the left image of FIG. 1D (step 43). In this example, the image shown on the left side of FIG. 1D is above a display that contains the actual product, i.e., one or more of the heart-shaped sunglasses that are on sale. The user scans the QR code with his or her mobile device (step 44). This automatically activates the mobile device browser, which goes to a URL encoded within the QR code. This causes the mobile browser to display the webpage shown in the middle image of FIG. 1D. If the user places the order (step 45), e.g., by clicking on the "Place Order" button at the bottom of the webpage shown in the middle image of FIG. 1D, the transaction is performed. In FIG. 1D, the transaction is completed (step 46), and a digital receipt is generated and displayed in the mobile browser (step 47), as seen in the right image of FIG. 1D. The shopper can then take one of the pairs of sunglasses from the display and walk out of the store, e.g., showing the receipt to a store employee that checks receipts of shoppers leaving the store. In this manner, the entire purchase is performed without interaction with a store POS terminal or even a store cashier, and without any specialized or merchant specific mobile app.

Transaction Bridge Platform Servers

Functionality of a transaction bridge platform server is discussed, according to embodiments. Transaction bridge platform server (cloud app based) functions could also be performed by a social network, an aggregate cloud service, an enterprise cloud server, or a merchant cloud server, or any other server.

Figure 1E:
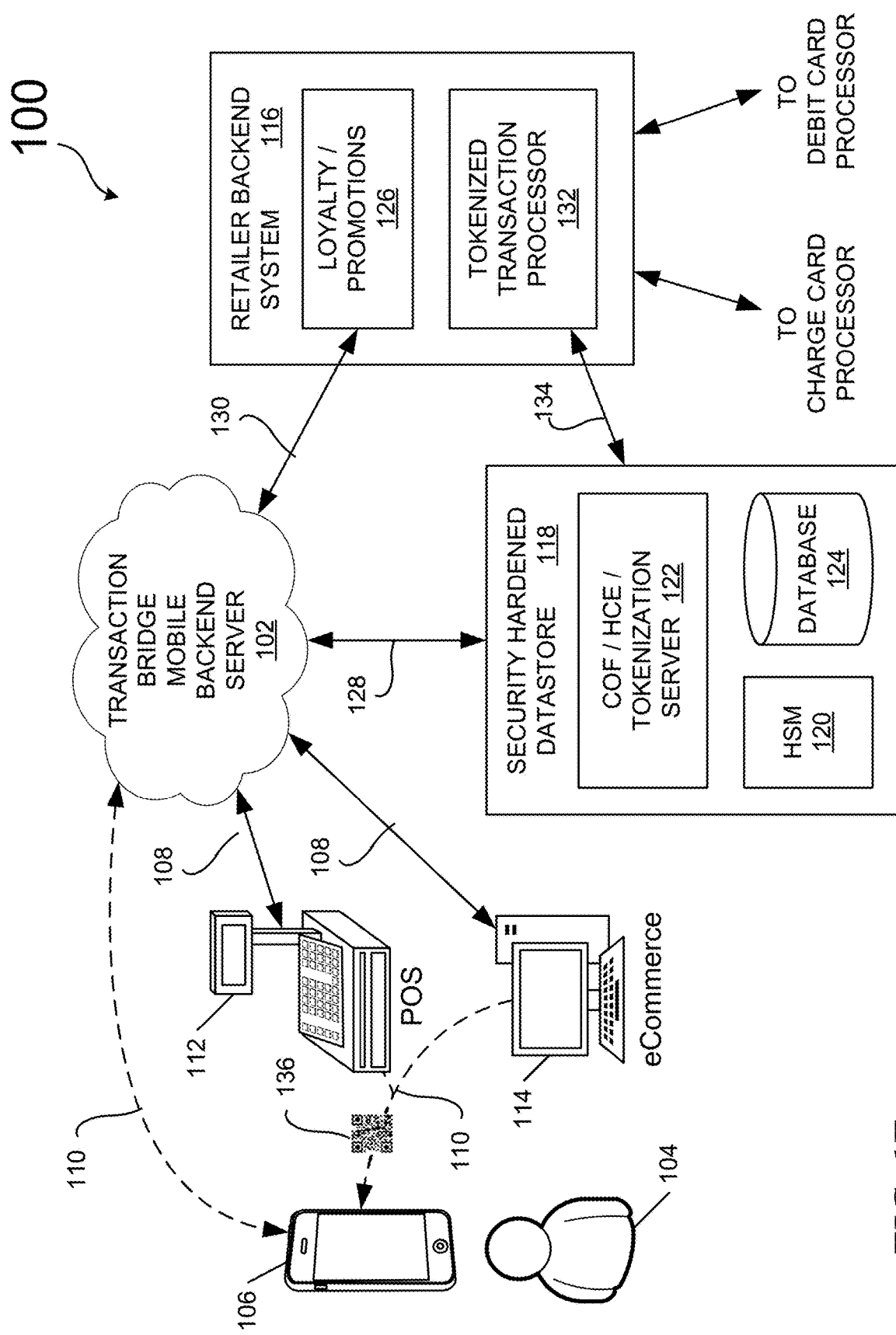
FIG. 1E is a block diagram illustrating an exemplary system 100 for merchants or service providers to engage shoppers in or near their physical stores using cloud based app(s) only, without requiring their shoppers to download a specific mobile app according to an embodiment of the subject matter described herein.

FIG. 1E is a block diagram illustrating an exemplary system 100 for merchants or service providers to engage shoppers in or near their physical stores using cloud based app(s), without requiring their shoppers to download any specific mobile app, according to an embodiment of the subject matter described herein.

In the embodiment illustrated in FIG. 1E, system 100 includes a transaction bridge mobile backend (MBE) server 102, which stores and maintains private information, including sensitive or confidential information, of a user 104 of a mobile device 106 and that can provide that private information to a variety of entities via secure communication channels 108, which are shown in FIG. 1E as solid lines, so that the user 104 can engage in electronic transactions involving that private information without having to pass private information over insecure channels 110, which are shown in FIG. 1E as dashed lines.

In one embodiment, the mobile device 106 can perform one or more of the following functions: optical character recognition (OCR), for identifying items, coupons, or other information; QR code scanning, where the QR code may be decoded on the mobile device 106 or at a remote server set up for that purpose; multi-factor authentication based on information provided by the user 104, including but not limited to passwords, pass codes, biometric data, etc.; connection to the MBE server 102 (also referred to as a transaction bridge mobile backend server or a transaction bridge server); and enhanced, interactive checkout flow management. It is presumed that the mobile device 106 has the capability to browse the internet.

In one embodiment, the MBE server 102 may perform one or more of the following functions: interfacing with the mobile device; authentication and user registration; user profile management and security; managing system work flow; host card emulation (HCE)-tokenized transaction management; POS/ecommerce addressing and connectivity management; loyalty/promotions support; payment card behavior management; management of transaction logs/digital receipts; and assisting with merchant coupon processing.

MBE server 102 can provide private information via secure channels 108 to a variety of entities. For example, MBE server 102 may provide sensitive and confidential payment information to a POS terminal 112 or ecommerce website/server 114 via secure channels 108 for the purpose of performing a payment ecommerce transaction. System 100 can provide "credentials in the cloud", which provides sensitive information via secure communication channels 108 and thus avoids transmission of credentials and other sensitive data from mobile device 106 over insecure channels 110. MBE server 102 can also interact securely with a retailer backend (RBE) system 116 to process loyalty discounts, promotions, membership-related benefits, and other functions. In one embodiment, MBE server 102 may be a component within RBE system 116.

In one embodiment, MBE server 102 uses a security hardened datastore (also referred to as "the datastore") 118 to store critically sensitive data such as encryption keys. A hardware security module (HSM) 120, which is hardware that is hardened against attack and unauthorized access, may be used to store or encrypt/decrypt the encryption keys used by system 100. Datastore 118 may also include a card on file (COF)/HCE module 122, which may operate as a tokenization server. In the embodiment illustrated in FIG. 1E, datastore 118 may include one or more databases 124 or other storage means. The MBE server 102 may communicate with the datastore 118 via a secure communication channel 128. The datastore 118 may be co-located with the MBE server 102, or it may be located remotely from MBE server 102. In one embodiment, the datastore 118 may perform one or more of the following functions: tokenization generation; detokenization; "card on file" processing; providing a public key infrastructure (PKI)-encrypted channel with the mobile client; providing payment card industry data security standard (PCI-DSS).

In the embodiment illustrated in FIG. 1E, the RBE system 116 includes a loyalty/promotions module 126 that maintains merchant-specific information about loyalty and promotions and that communicates with the MBE server 102 via a secure channel 130. The MBE server 102 can then communicate information about loyalty and promotions to the POS terminal 112, the ecommerce site 114, and/or directly to the user's mobile device 106. Such information can include information about promotions, information about opportunities to get loyalty or rewards points, and so on, at any time—including well before payment is initiated (e.g., before the card swipe). This allows the user 104 the opportunity to make pre-payment decisions about which products to select, which payment instrument to use, and so on, and allows the merchant the opportunity to provide incentives to the customer, well before the transaction is concluded.

In the embodiment illustrated in FIG. 1E, the RBE system 116 includes a tokenized transaction processor (TTP) 132 for generating and/or redeeming tokens, which are bits of data that conceptually represent payment information but which do not actually contain any payment information. In the embodiment illustrated in FIG. 1E, the TTP 132 communicates with the HCE/tokenization server 122 via a secure channel 134. In an alternative embodiment, TTP 132 may be a part of the security hardened datastore 118. The use of tokens as a substitute for actual payment information provides an additional level of security since, even if an unauthorized entity intercepts or otherwise sees the tokenized data as it travels along the communication paths within system 100, the unauthorized entity does not know what payment information that particular token is supposed to represent. In one embodiment, the RBE system 116 may perform one or more of the following functions: filtering tokenized transactions; communicating with an external de-tokenization server; translating transaction content; providing integration with a retailer switch; providing integration with processing partners; and managing retailer profiles.

The MBE server 102 can provide non-payment types of information as well. For example, the MBE server 102 can provide medical records, medication lists and prescriptions, medical symptoms and complaints, or other potentially very private patient information to a medical professional, medical facility, health care provider, or health insurance provider via a secure channel in response to a request to do so sent from mobile device 106 by the user 104. Because this information is provided from the MBE server 102 rather than from mobile device 106, the amount of data being provided can be enormous, and need not be limited by the capacity of mobile device 106 or limited by the user's data plan or other limitation imposed on the user 104 by the user's internet service provider (ISP) or cellphone provider.

System 100 leverages the benefits of several distinct types of connectivity:

Mobile to POS: mobile device 106 can receive information directly from POS terminal 112. This information may be displayed by the POS terminal 112 as a QR code, bar code, or other image, which mobile device 106 can scan and decode to extract the information. Mobile device 106 can also receive information through a digital connection with POS terminal 112, such as a wired or wireless connection, such as Wi-Fi, WiMAX, Bluetooth, BLE, Beacon, IR, audio file, and other means.

Mobile to cloud: mobile device 106 can also connect directly to the MBE server 102 for a variety of purposes, including setting up and registering the mobile device, associating the mobile device to a user, entering the user's confidential data via a secure connection, managing user-defined rules, and so on.

Cloud to POS: the MBE server 102 provides a secure backend connection to a POS terminal 112, ecommerce website/server 114, etc., which is used to pass payment information or other sensitive information over a secure channel 108 rather than through mobile device 106 and an insecure or unsecured channel 110.

Cloud to secure data store: the MBE server 102 provides a secure backend connection to secure datastore 118, which can store encryption keys or other critically sensitive data.

Cloud to merchant backend server: the MBE server 102 provides a secure backend connection to a RBE system 116, which may provide information about a payment or non-payment transaction, loyalty programs, promotions, member discounts, and other features and functions that merchants desire to provide to existing and potential customers in order to encourage business.

Flexibility and control. The MBE server 102 can act as an intermediary or clearinghouse for all of a user's electronic transactions, which puts it in the unique position to provide centralized control of payment instruments. In one embodiment, the MBE server 102 can allow a user to define his or her own custom controls or rules to flexibly control not only the behaviors and capabilities of the user's own payment instruments or accounts but also control the payment instruments or accounts of other users, such as family members, employees of a company, or other groups of people. The MBE server 102 can support (and control) multiple payment types, multiple accounts, multiple credentials, etc., for multiple users, including on a per-group and/or per-user basis.

Examples of transaction or account information include, but are not limited to, an account name, an account number, an account issuing bank, a user name, a user physical address, a user shipping address, identification information for identifying a user, and authentication information for authenticating a user.

Examples of a transaction of the user include, but are not limited to, a payment or purchase; a credit transaction; a debit transaction; a deposit; a withdrawal; a money transfer; a transaction involving a loyalty program; a transaction involving a rewards program; or a transaction involving a diet, health, or fitness program.

System 100 provides a mechanism by which a merchant can interact with a consumer long before the last step of payment. For example, user 104 may use mobile device 106 to scan a QR code printed on or near an item of interest to get information about that item. Mobile backend server 102 can detect this interaction and provide the merchant the opportunity to determine who the user is, determine whether that user is a loyalty or discount club member, and, if so, notify the user via mobile device 106 or a dynamic display near the item, that there is a lower price for club members. User 104 may be notified, via mobile device 106 or other means, that selecting one payment instrument (e.g., a credit card issued by the merchant, for example) may result in even greater discounts, rewards, points, entries into drawings or giveaways, etc. The user may be given an opportunity to redeem reward points for discounts or prizes. The ability to engage in significant pre-payment activity allows the merchant to provide the customer with a richer, multi-dimensioned transaction experience, to the benefit of both.

Convenience. System 100 makes possible a wide range of transactions that can be performed using mobile device 106 without the overhead of a secure connection to and from mobile device 106. In one example, a user who is shopping on an ecommerce site 114 and desires to start the checkout process to complete the purchase may select a "pay now" option displayed on the ecommerce site. In one embodiment, a QR code that includes information about the transaction (or information that may be used to retrieve information about the transaction) may be displayed on the ecommerce website checkout screen, which the user scans using mobile device 106. Mobile device 106 then may decode the QR code and send the decoded information to mobile backend server 102. Mobile backend server 102 may then query a database to get entity-defined or user-defined preferences and rules that may determine whether the desired transaction will be allowed or not allowed, whether a notification or alert will be sent or not sent, or other specific behaviors and capabilities for specific transactions and/or accounts as defined by the user.

If the transaction is allowed, mobile backend server 102 may then query the database to retrieve the pertinent account information and use that information to perform or initiate the desired transaction. Examples of an account of the user include, but are not limited to, a card payment account or a non-card, cardless, or virtual card account, a payment account; a credit, debit, or prepaid account; a branded account; a retailer or private label account; a gift or gift card account, a loyalty account; a healthcare or wellness account; an access account; a membership account; or a rewards account.

In another example, a user may desire to use mobile device 106 to perform or complete a secure financial transaction at a physical store, in which case point of interaction may be POS terminal 112. In this scenario, POS terminal 112 may transmit information over insecure channel 110 to mobile device 106, which communicates a preference for a payment type to mobile backend server 102 over another insecure channel 110. Mobile backend server 102 provides the sensitive information needed to perform the financial transaction to POS terminal 112 over a secure backend channel 108.

Mobile device 106 may be used to provide secure authentication of the user/account owner, such as via the use of passwords, passcodes, personal identification numbers (PINs), biometrics, social networking, physical location, etc. In this scenario, authentication information (or proof of successful authentication) may be conveyed to mobile backend server 102, which may then allow the desired electronic transaction.

Where the desired transaction is a financial transaction, in one embodiment, mobile backend server 102 may determine, based on the application of the user-defined rules, that the transaction is allowed. In this scenario, mobile backend server 102 may then retrieve confidential information, such as payment details, from a database, from secure datastore 118, or from some other datastore, and send that information to a payment transaction network that handles the transfer of funds from the user's account in one bank to the merchant's account in another bank, for example.

Examples of the information associated with the desired transaction include, but are not limited to, information about a type of the transaction, an amount of the transaction, a party to the transaction, a time of the transaction, a location of the transaction, and a good, service, or subject of the transaction.

In one embodiment, the mobile backend server 102 receives the information associated with a desired transaction from a mobile device 106 of the user.

In one embodiment, the mobile device 106 of the user may receive the information associated with the desired transaction from a user of the mobile device 106, a point of sale terminal, an ecommerce website, or the mobile backend server 102.

In one embodiment, the mobile device 106 of the user receives the information associated with the desired transaction via scanning and decoding QR code that encodes at least some of the information.

In one embodiment, the mobile device 106 of the user receives the information associated with the desired transaction via NFC.

Examples of transactions include, but are not limited to, transactions made using a physical point of sale terminal, transactions made online or via an ecommerce website, and transactions made using a mobile device.

In one embodiment, the entity-defined or user-defined preferences that control behaviors and capabilities of the entity's accounts and/or account transactions on a per-user basis may include a preference related to an account.

Examples of a preference related to an account include, but are not limited to: an active/enabled or inactive/disabled state the account; a restriction on use of the account involving a user or class of users; a restriction on use of the account involving a merchant or class of merchants; a restriction on a transaction involving an ecommerce site or class of ecommerce sites; a restriction on a transaction involving a point of sale terminal or class of point of sale terminals; a restriction on use of the account for a good or class of goods; a restriction on use of the account for a service or class of services; a temporal restriction on use of the account; a geographical restriction on use of the account; a restriction on a class of accounts; a restriction on an amount or range of amounts allowed per transaction; a restriction on an amount or range of amounts allowed per a period of time; a restriction on a type of device used to perform the transaction; an ability to transfer funds to or from the account; an ability to transfer control of the account; an ability to create a sub-account; an ability of the account to be shared by multiple users; and any combination of the above.

In one embodiment, the entity-defined or user-defined preferences that control behaviors and capabilities of the entity's accounts and/or account transactions on a per-user basis may include a preference related to a transaction.

Examples of a preference related to a transaction include, but are not limited to: a restriction on a type of transaction; a restriction on a transaction involving a user or class of users; a restriction on a transaction involving a merchant or class of merchants; a restriction on a transaction involving an ecommerce site or class of ecommerce sites; a restriction on a transaction involving a point of sale terminal or class of point of sale terminals; a restriction on a transaction for a good or class of goods; a restriction on a transaction for a service or class of services; a temporal restriction on transactions; a geographical restriction on transactions; a restriction on a transaction for an amount limit or range of amounts; a restriction on a type of device used to perform the transaction; a restriction on a transaction's recurrence; and any combination of the above.

In one embodiment, the entity-defined or user-defined preferences that control behaviors and capabilities of the entity's accounts and/or account transactions on a per-user basis may include an application of an entity-defined or user-defined preference.

Examples of application of an entity-defined or user-defined preference include, but are not limited to: imposition of a user's favored preference, prohibition of a user's disfavored preference, selection of a user's most favored preference of those available for a particular transaction, and selection of a user's most favored preference of those available for a particular account.

Examples of an entity-defined or user-defined preference include, but are not limited to, a shipping preference, a level or type of authentication to be required for the transaction or account, a level of type authorization to be required for the transaction or account, and a level of type notification of the occurrence of a transaction or account.

In one embodiment, the entity-defined or user-defined preferences that control behaviors and capabilities of the entity's accounts and/or account transactions on a per-user basis may include a preference related to a condition.

Examples of a preference related to a condition include, but are not limited to, a preference related to a condition of the transaction, a preference related to a condition of the account, a preference related to a condition of the user, or any combination of the above.

In one embodiment, a user or other entity with administrative privileges can control behaviors and capabilities of the entity's accounts or account transactions as applied to another user.

Examples of the transaction or account information include, but are not limited to, an account name, an account number, an account issuing bank, a user name, a user physical address, a user shipping address, identification information for identifying a user, and authentication information for authenticating a user.

Examples of a transaction of the user include, but are not limited to, a payment or purchase, a credit transaction, a debit transaction, a deposit, a withdrawal, a money transfer, a transaction involving a loyalty program, a transaction involving a rewards program, and a transaction involving a diet, health, or fitness program.

Examples of an account of the user include, but are not limited to, a card payment account, and a non-card, cardless, or virtual card account.

Examples of an account of the user include, but are not limited to, a payment account, a credit, debit, or prepaid account, a branded account, a retailer or private label account, or a gift or gift card account.

Examples of an account of the user include, but are not limited to, a loyalty account, a healthcare or wellness account, an access account, a membership account, or a rewards account.

In one embodiment, applying user-defined preferences to the user's transactions includes receiving information associated with a desired transaction, determining a user associated with the desired transaction, determining a user account associated with the user, determining a user-defined preference for the desired transaction, for the user account, or both, and applying the user-defined preference to modify a behavior or capability of the desired transaction, user account, or both.

Examples of the information associated with the desired transaction include, but are not limited to, a type of the transaction, an amount of the transaction, a party to the transaction, a time of the transaction, a location of the transaction, and a good, service, or subject of the transaction.

In one embodiment, the mobile backend server receives the information associated with a desired transaction from a mobile device of the user. The mobile device of the user may have received the information associated with the desired transaction from a user of the mobile device, a point of sale terminal, an ecommerce website, or the mobile backend server.

In one embodiment, the mobile device of the user receives the information associated with the desired transaction via scanning and decoding QR code that encodes at least some of the information.

In one embodiment, the mobile device of the user receives the information associated with the desired transaction via NFC.

Examples of the transactions include, but are not limited to, transactions made using a physical point of sale terminal, transactions made online or via an ecommerce website, and transactions made using a mobile device.

In one embodiment, the entity-defined or user-defined preferences that control behaviors and capabilities of the entity's accounts and/or account transactions on a per-user basis may include a preference related to an account.

Examples of a preference related to an account include, but are not limited to: an active/enabled or inactive/disabled state the account, a restriction on use of the account involving a user or class of users, a restriction on use of the account involving a merchant or class of merchants, a restriction on a transaction involving an ecommerce site or class of ecommerce sites, a restriction on a transaction involving a point of sale terminal or class of point of sale terminals, a restriction on use of the account for a good or class of goods, a restriction on use of the account for a service or class of services, a temporal restriction on use of the account, a geographical restriction on use of the account, a restriction on a class of accounts, a restriction on an amount or range of amounts allowed per transaction, a restriction on an amount or range of amounts allowed per a period of time, a restriction on a type of device used to perform the transaction, an ability to transfer funds to or from the account, an ability to transfer control of the account, an ability to create a sub-account, an ability of the account to be shared by multiple users, and any combination of the above.

In one embodiment, the entity-defined or user-defined preferences that control behaviors and capabilities of the entity's accounts and/or account transactions on a per-user basis may include a preference related to a transaction.

Examples of a preference related to a transaction include, but are not limited to: a restriction on a type of transaction, a restriction on a transaction involving a user or class of users, a restriction on a transaction involving a merchant or class of merchants, a restriction on a transaction involving an ecommerce site or class of ecommerce sites, a restriction on a transaction involving a point of sale terminal or class of point of sale terminals, a restriction on a transaction for a good or class of goods, a restriction on a transaction for a service or class of services, a temporal restriction on transactions, a geographical restriction on transactions, a restriction on a transaction for an amount limit or range of amounts, a restriction on a type of device used to perform the transaction, a restriction on a transaction's recurrence, and any combination of the above.

In one embodiment, the entity-defined or user-defined preferences that control behaviors and capabilities of the entity's accounts and/or account transactions on a per-user basis may include an application of an entity-defined or user-defined preference.

Examples of application of an entity-defined or user-defined preference include, but are not limited to: imposition of a user's favored preference, prohibition of a user's disfavored preference, selection of a user's most favored preference of those available for a particular transaction, and selection of a user's most favored preference of those available for a particular account.

Examples of an entity-defined or user-defined preference include, but are not limited to: a shipping preference, a level or type of authentication to be required for the transaction or account, a level of type authorization to be required for the transaction or account, and a level of type notification of the occurrence of a transaction or account.

In one embodiment, the entity-defined or user-defined preferences that control behaviors and capabilities of the entity's accounts and/or account transactions on a per-user basis may include a preference related to a condition.

Examples of a preference related to a condition include, but are not limited to, a preference related to a condition of the transaction, a preference related to a condition of the account, a preference related to a condition of the user, or any combination of the above.

Pre-payment activity. In contrast to a conventional credit card, which provides identifying information to the merchant at the very end of the customer experience—i.e., when the customer has seen the total price, has agreed to pay, and swipes the card through the card reader for the purpose of completing a payment transaction that has already been defined—the MBE server 102's position as intermediary between a merchant or payment network and a customer allows it (and by extension any or all of the parties to the desired or pending transaction) to engage in novel and valuable pre-payment activity.

Dynamic, interactive presentation and selection of loyalty, rewards, and promotions during shopping or checkout. The operation of system 100 will be described in more detail below, with reference to the embodiment illustrated in FIG. 1E, but the subject matter is not limited to just this particular embodiment. For the purposes of illustration only, an interaction between the user's mobile device 106 and the POS terminal 112 will be described. In this example, the POS terminal 112 will present to the user 104 a QR code 136, which the user 104 will scan using the mobile device 106.

Figure 2:
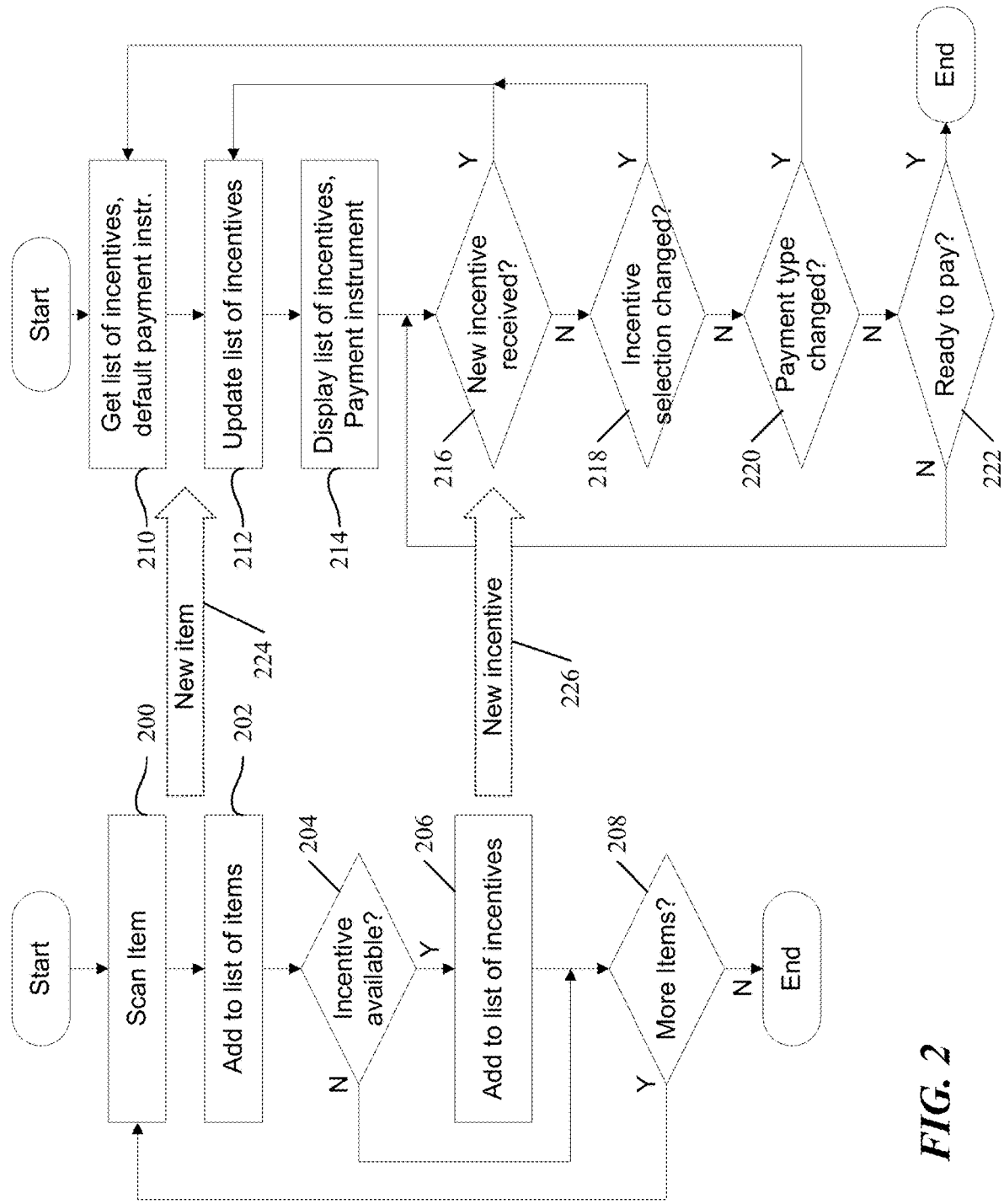
FIG. 2 illustrates exemplary processes for performing secure mobile payment and non-payment transactions with integrated loyalty, rewards, and promotions according to an embodiment of the subject matter herein.

FIG. 2 illustrates exemplary processes for performing secure mobile payment and non-payment transactions with integrated loyalty, rewards, and promotions according to an embodiment of the subject matter herein. For brevity, the term "incentives" is herein used to refer to loyalty or rewards points, promotions, coupons, discounts, offers, or other benefits that may be offered to the customer by the merchant, manufacturer, or other entity. The flow chart on the left side of FIG. 2 illustrates steps that may be performed during shopping or other item selection process and/or during checkout, and which are collectively referred to as "determining incentives". The flow chart on the right side of FIG.

2 shows actions that may be taken in response to the shopping, selection, or checkout process, and which are collectively referred to as "selecting incentives". The steps illustrated in FIG. 2 may be performed by the mobile device 106, the POS terminal 112 or ecommerce site 114, the MBE server 102, the RBE system 116, or some combination of the above.

In the embodiment illustrated in FIG. 2, the process of determining incentives starts when an item is scanned (block 200). The item may be scanned during the process of checking out, e.g., by a POS terminal 112, or prior to checkout, such as while the user is browsing a physical store, e.g., by scanning a barcode, SKU identifier, or other product identifier using his or her mobile phone 106. In one embodiment, the scanned item is added to a list of items (block 202). If an incentive related to that item is available (block 204), it is added to a running list of incentives (block 206). Otherwise the proceed continues to block 208. The process ends when there are no more items (block 208) or other trigger condition.

In the embodiment illustrated in FIG. 2, the process of selecting incentives includes getting the list of incentives, and, optionally, the default payment instrument (block 210), updating that list if needed (block 212), and displaying or otherwise presenting that list of available incentives, and, optionally, the current payment instrument, to the user (block 214). In one embodiment, the user's mobile device 106 will dynamically display to the user 104 incentives that are available. The incentives may be displayed item-by-item, e.g., when a new item is scanned, any available coupons, offers, or other incentives may be added to a list of incentives being displayed to the user 104 via the mobile device 106. When a new incentive is received (block 216), the list of incentives is updated (block 212). In one embodiment, the user 104 may indicate which incentives he or she wants to take advantage of (and which to not take advantage of), in which case an incentive selection may change (block 218), which may also trigger the list of incentives to be updated (block 212).

In one embodiment, the list of incentives that are available may depend upon the particular payment instrument selected for use by the user 104. In the embodiment illustrated in FIG. 2, for example, if the user 104 selects a different payment type (block 220), this may require getting the list of incentives again (block 210), which may include a completely different set of incentives. For example, a merchant may offer certain incentives exclusively to shoppers that intend to pay with a merchant-preferred credit card. Thus, the list of incentives may change depending on the payment instrument selected, depending on the loyalty program selected, depending on some other customer selection, or some combination of the above. The process of selection ends when the user 104 indicates that he or she is ready to pay or otherwise conclude the transaction (block 222).

FIG. 2 illustrates the principle that the list of incentives displayed to the user for selection may dynamically change due to events that occur prior to the actual payment step, such as during the checkout process or even before that, during the shopping process. In the embodiment illustrated in FIG. 2, using the example of a checkout process, when a new item is scanned by the POS terminal 112, notification that the particular items has been scanned may be passed to the mobile device 106, the MBE server 102, the RBE system 116, or other entity (arrow 224). This information may be used to determine whether there are any item-specific incentives available to the user, e.g., in block 210 of FIG. 2. This is especially helpful if the payment type changes, as in block 220, because the list of available incentives may depend not only on the payment type selected by the user 104 but also on the particular items scanned—e.g., some items may have discounts only if a particular payment instrument or payment type is used to complete the purchase. Thus, the "get list of incentives" step in block 210 would be more efficient if that process also maintained a list of items scanned. Alternatively, the incentive selection process may only receive notifications that a new incentive is available (arrow 226). In yet another alternative, both notifications may be sent.

In an alternative embodiment, a POS terminal 112 may simply scan an item (block 200) and provide notification of that new item (arrow 224), while the other steps of maintaining a list of items, determining available incentives, maintaining the list of available incentives, displaying the available incentives to the user, and processing the user's selection of incentives, may be handled by other entities within system 100, such as by the MBE server 102, the mobile device 106, the RBE system 116, some other entity not listed, or some combination of the above.

There are a variety of different ways in which the list of incentives may be determined. In one embodiment, the POS terminal 112 may notify the MBE server 102 whenever a new item is scanned (or after all of the items have been scanned), and the MBE server 102 may interact with the retailer backend system to determine what incentives are available for a particular user 104. The list of incentives may be provided to the user via POS terminal 112/ecommerce site 114 or via the user's mobile device 106. The particular list of incentives available to that particular user may be determined by the MBE server 102 and/or the RBE system 116. Once determined, the particular list of incentives may be sent directly or via an intermediary. For example, if the RBE system 116 determines which incentives are available for the particular user 104, the RBE system 116 may send that information to the user's mobile device 106 directly or to the MBE server 102, which forwards that information to the mobile device 106.

The dynamic and possibly iterative nature of the process illustrated in FIG. 2 illustrates the dual points that the amount of discounts or other incentives offer to the user may change based on the selected payment instrument and that the total amount that the user ultimately pays for the transaction may also change based on the particular incentives that use user chooses to take advantage of or to not take advantage of.

Ease of use. Because system 100 provides enormous flexibility, the amount of information that is presented to the user 104 may be overwhelming, especially when the user has many different options and combinations of options. Thus, in one embodiment, the user 104 is provided with a dashboard or summary of options. An example of a dashboard is shown in FIGS. 3A, 3B, and 3C.

FIGS. 3A, 3B, 3C, 3D, 3E, 3F, and 3G are simulated screenshots of an exemplary user interface for performing secure mobile payment and non-payment transactions with integrated loyalty, rewards, and promotions according to embodiments of the subject matter described herein.

Figure 3A:
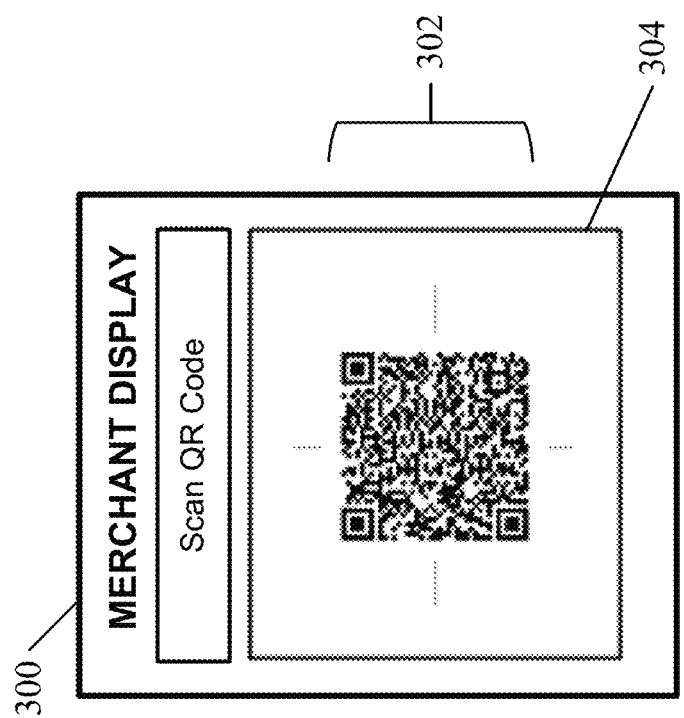
FIGS. 3A, 3B, 3C, 3D, 3E, 3F, and 3G are simulated screenshots of an exemplary user interface for performing secure mobile payment and non-payment transactions with integrated loyalty, rewards, and promotions according to embodiments of the subject matter described herein.
Figure 3B:
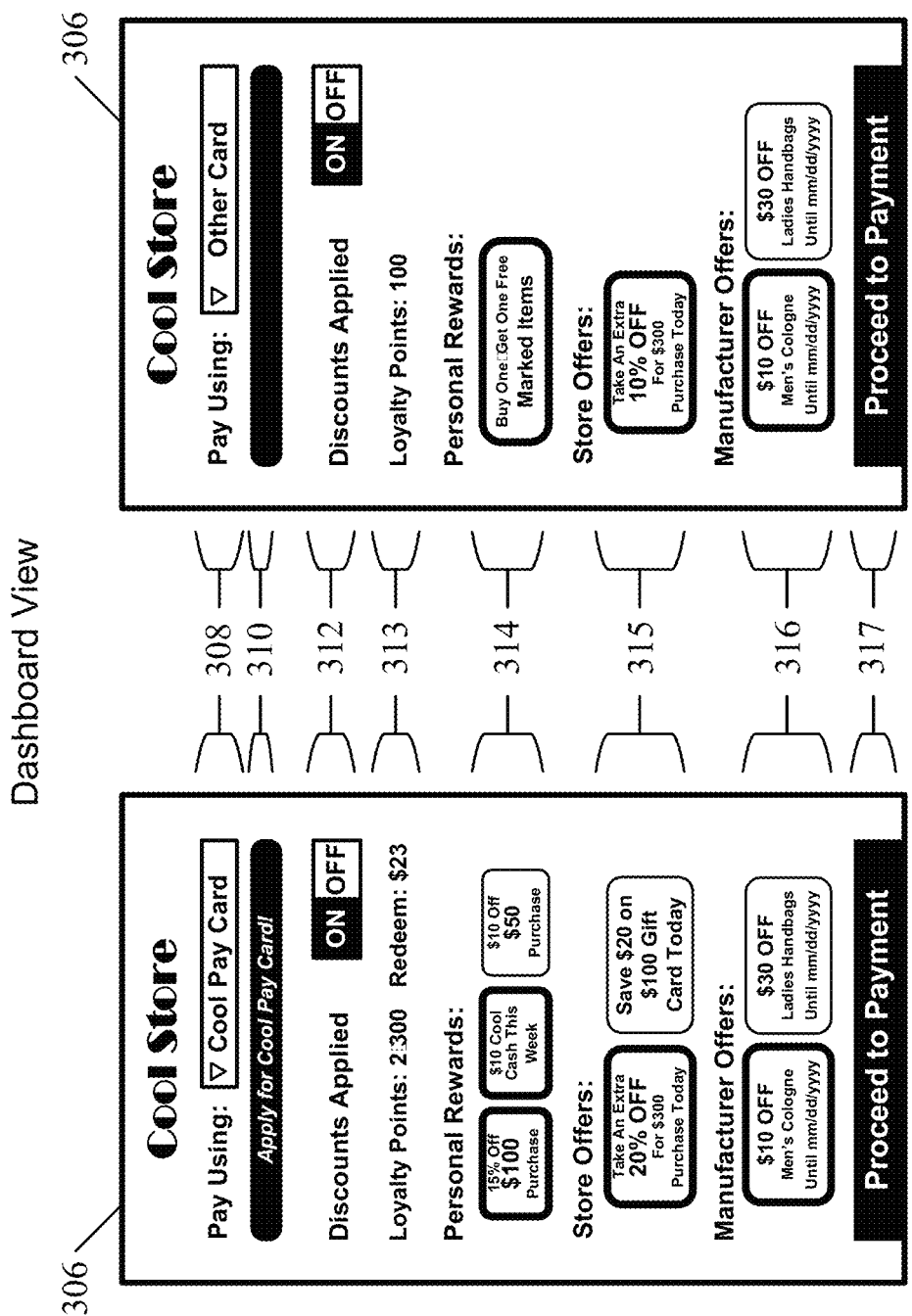
Figure 3C:
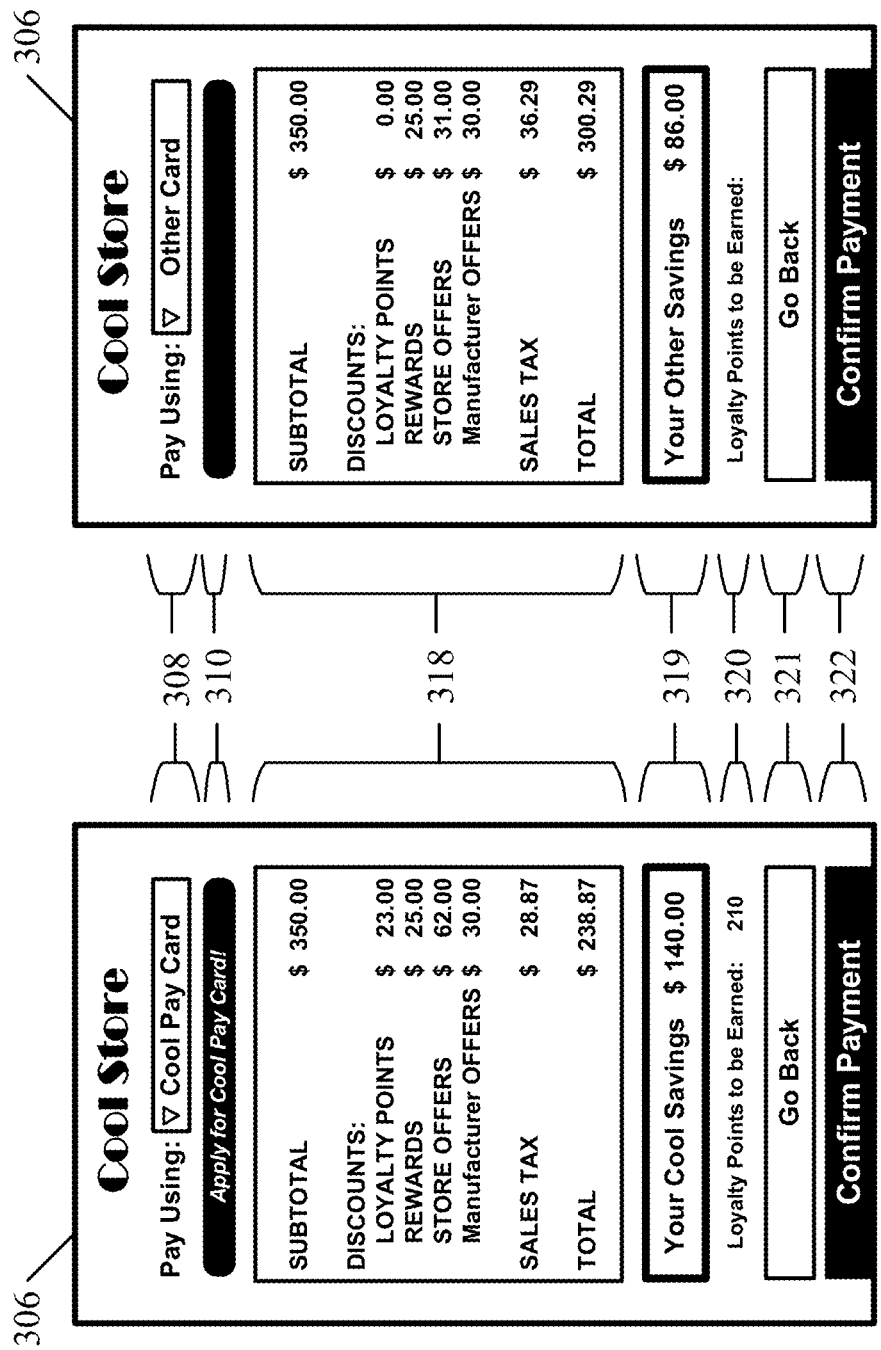

FIG. 3A illustrates an example user interface (UI) 300 according to an embodiment of the subject matter described herein, which may be presented to the user 104 by a merchant, e.g., displayed by a POS terminal, by an advertisement, by a merchant employee via some other means, etc. In this example, the UI 300 presents to the user 104 a QR code 302, which may be scanned or otherwise acquired by the mobile device 106. In embodiments where the QR code 302 is presented by an entity such as the POS terminal 112, UI 300 may include a target window 304 for centering the external QR code image in the proper location to be captured by the mobile device's onboard camera. Information may be conveyed to the mobile device 106 via other mechanisms as well, including via wireless communication, such as Wi-Fi, Bluetooth, and NFC, via wired communication, via removable memory device, via manual entry, via scanning other visual images like barcodes, text, etc., and via audio files, which are received or recorded by the mobile device 106.

Scanning the QR code 302 (or receiving information via other mechanisms such as Bluetooth, NFC, etc.) takes the user's browser to a web page 306 dynamically generated by the MBE server 102.

FIG. 3B illustrates how the web page 306 may display to the user 104 a "dashboard" view of the options currently available for selection by the user 104 according to an embodiment of the subject matter described herein, and how those options might change based on the payment instrument selected. In the embodiment illustrated in FIG. 3B, for example, web page 306 displays a payment instrument selection button 308, by which the user can select or change the manner of payment, e.g., credit card, debit card, cash, etc., as well as the particular instrument used, e.g., a merchant-branded card, a club membership card, and the like. FIG. 3B shows two different scenarios: the example on the left showing how web page 306 might look if the user selects a merchant-branded or merchant-preferred card (e.g., the "Cool Pay Card"), and the example on the right showing how web page 306 might look if the user selects some other card (e.g., the "Other Card"). As can be seen in FIG. 3B and as will be described in more detail below, the loyalty points, rewards, coupons, and/or offers available to the user may differ depending on the payment instrument selected by selection button 308. The visual elements of web page 306 will now be described.

Instant application/registration. In one embodiment, the web page 306 may include a button 310 that allows the user 104 to instantly apply for a merchant-branded or other type of payment or loyalty/rewards card online. By lowering the barrier to entry by eliminating or streamlining the application process, e.g., by using information about the user 104 that was collected during the initial setup with the merchant, the button 310 makes it more likely that the user 104 will sign up for the merchant-branded card than if the user 104 had to fill out paperwork or an online form. In addition, the request may be sent over the network to a retail application server which can quickly accept or deny the application, providing the user 104 with nearly instantaneous application completion, e.g., quickly enough that the user 104 can use the merchant-branded card to complete the transaction at hand. This mechanism could be used to apply for any type of card, including payment cards, merchant-branded cards, network-branded cards, private label cards, as well as non-payment cards. In one embodiment, if the user 104 already possesses a payment or loyalty/rewards card, the user 104 may use button 310 to register the card online. For example, if the mobile device 106 includes a camera, the user 104 may use the camera to scan or take a picture of the card; the mobile device will scan the image to determine identifiers such as user ID, loyalty ID, merchant ID, account numbers, etc., and use that information to register the card and associate it with the particular user 104.

In one embodiment, the user 104 may be notified that he or she may qualify for additional benefits simply by signing up—i.e., unrelated to subsequent payment or non-payment transactions using the card—such as earning points or rewards for signing up or for transferring an existing balance, for example.

Speculative/potential benefits. A very powerful yet easily overlooked beneficial aspect of the embodiments of the subject matter described herein is that the user 104 has the ability to discover what benefits there may be had from using a merchant-branded payment or loyalty/rewards card, even if that user does not have the merchant-branded card yet. The ability to see how rewards, points, offers, and coupons change based on the particular payment instrument used provides a unique opportunity for a merchant or retailer to graphically demonstrate to the user 104 how that user might benefit from the use of the merchant-branded (or merchant-preferred) payment instrument and/or loyalty or rewards program. This can provide a powerful incentive for the user to apply for the merchant-branded or merchant-preferred payment instrument or program, which can benefit both the user 104 and the merchant. In the embodiment illustrated in FIG. 3B, button 310 is active if the Cool Pay Card has been selected but inactive, disabled, and/or blank if the Other Card has been selected, e.g., because the Other Card does not have an instant application process or because the merchant only wants to provide this capability for the merchant-branded or merchant-preferred card, such as the Cool Pay Card in this example.

In the embodiment illustrated in FIG. 3B, the UI 300 includes an on/off toggle 312 allows the user 104 to enable or disable the process of determining L/R/P information and/or applying the discounts. This is useful, for example, when the user 104 is using a company-provided credit card, in which case the user 104 may not want to consume or redeem any loyalty or rewards points and/or coupons.

In the embodiment illustrated in FIG. 3B, the web page 306 includes a loyalty status line 313, which displays the user's current number of loyalty or rewards points earned (e.g., 2,300) and what dollar value they have should the user redeem them for cash or apply them towards a purchase (e.g., $23) if the user chooses to pay using the Cool Pay Card. If the user chooses the Other Card, however, the loyalty status line 313 is updated to reflect the loyalty points available to that payment instrument (e.g., system 100), which in this case are not instantly redeemable, e.g., because the Other Card does not have such an arrangement with the merchant, or because the merchant wants to use the ability to instantly redeem loyalty points at the time of purchase as an incentive for customers to use that merchant's preferred payment instrument.

In one embodiment, the web page 306 may display personal rewards 314 that are available to the user 104. In the embodiment illustrated in FIG. 3B, for example, the user who has opted to pay using the Cool Pay Card has selected the option to save "15% off of a $100 purchase" and the option to win $100 in "cool cash" this week, but has not selected the "$100 off of a $302 purchase" reward option. In this embodiment, selected options are indicated by a thicker border than is displayed for unselected options, but other methods of indicating a selection are also contemplated. The user who has opted to pay using the Other Card, however, has a different set of rewards available. In the embodiment illustrated in FIG. 3B, for example, the Other Card user has only a "buy one, get one free on marked items" option.

In one embodiment, the web page 306 may display store offers 315 that are available to the user 104. In the embodiment illustrated in FIG. 3B, for example, the Cool Pay Card user has selected the option to "Take An Extra 110% Off for $300 Purchase Today" option, but has not selected the "Save $110 on $100 Gift Card Today" option. In the embodiment illustrated in FIG. 3B, the Other Card user may have the same option available, such as the "Save $110 . . ." offer, but may also have similar, rather than same, options available, such as "Take an Extra 100% Off . . ." instead of taking an extra 110% off, which would be available had the user chosen to pay with the Cool Pay Card instead.

In one embodiment, the web page 306 may display Manufacturer offers 316 that are available to the user 104. In the embodiment illustrated in FIG. 3B, for example, the user has selected the option to save "$120 Off Coach brand Ladies Bags" but has not selected the option to save "$100 Off Polo Men's Cologne".

The embodiment illustrated in FIG. 3B is intended to illustrated the point that, depending on the payment instrument selected, some offers, such as the Manufacturer Offers may remain the same, other offers, such as the Store Offers, may change slightly, and still other offers, such as the Personal Rewards, may be completely different from payment instrument to payment instrument. By changing the payment instrument via selection button 308, the user can see how the loyalty, rewards, offers, coupons, and other incentives change based on what payment instrument is selected.

It should be noted that the web page 306 may be programmed so that certain sets of options are mutually exclusive and that other sets of options may be combined with each other. Likewise, the content, value, and/or terms of the rewards 314, the store offers 315, and the manufacturer offers 316 may change depending on the payment instrument selected using button 308 or other selections by the user 104. Also, other types of options not shown in FIG. 3B may be presented in addition to or instead of the set of options illustrated in FIG. 3B. The "dashboard" view provided by the web page 306 allows the user 104 to easily understand and negotiate what might otherwise be an overwhelming or confusing number of options.

In embodiments in which the MBE server 102 calculates optimal selections to assist the user 104 in choosing the set of options that provides the greatest benefit, the information displayed in the dashboard view (and in other views as well) may be initially displayed to the user with the optimum set of options already selected, e.g., pre-selected by the MBE server 102. This is a powerful feature that can further simplify the task of determining what options the user 104 should select. As the user 104 makes additional selections, or overrides the default selections, information about the selections (or information about only those selections that have changed) may be sent to the MBE server 102, in which case the optimization step may again be performed. In one embodiment, the user 104 may have the ability to enable, disable, or otherwise control or manage this automatic optimization process.

In the embodiment illustrated in FIG. 3B, the web page 306 includes a Proceed to Payment button 317, by which the user 104 may indicate that he or she has completed the selection process and is now ready to proceed to payment or otherwise complete the transaction.

It should be noted that the options made available to the user 104 may change or be presented to the user 104 on an item-by-item basis during the shopping and/or checkout process. In one embodiment, for example, the mobile device 106 dynamically interacts with the RBE system 116, either directly or through MBE server 102, during the checkout process. As each item is scanned during checkout, the user 104 may be presented with item-specific loyalty or rewards options, promotions, store or merchant coupons, etc. In one embodiment, the scanning operation at the POS terminal 112 provides item information to the RBE system 116; the RBE system 116 determines what L/R/P options are available to the user 104, and sends them to the MBE server 102 or the mobile device 106; the user 104 is then provided with a list of choices and options; the user 104 may then use the web page 306 on mobile device 106 to go through the list item by item and choose what promotions, etc., to accept and which ones to decline.

FIG. 3C illustrates how the web page 306 may display to the user 104 a summary view of the transaction as it will be executed using the user's selections, before the transaction is actually initiated, according to an embodiment of the subject matter described herein, and how those totals might change based on the payment instrument selected. FIG. 3C shows two different scenarios: the example on the left showing how web page 306 might look if the user has selected a merchant-branded or merchant-preferred card (e.g., the "Cool Pay Card"), and the example on the right showing how web page 306 might look if the user has selected some other card (e.g., the "Other Card").

In the embodiment illustrated in FIG. 3C, the web page 306 includes a summary section 318 for displaying summary information about the pending transaction, such as the subtotal before discounts, the discounts due to loyalty points, rewards, store offers, an manufacturer offers, the sales tax that will be applied, and a grand total, which is the subtotal minus discounts and plus tax.

In one embodiment, the web page 306 includes a section 319 for displaying to the user 104 a summary of the benefits that he or she will receive for having used the retailer's preferred payment method, loyalty program, and/or rewards card. This allows the retailer to highlight to the user 104 how the use of that particular retailer's branded card, for example, directly benefited the user 104.

In one embodiment, the web page 306 includes a section 320 for indicating to the user information about the selected loyalty program, such as the current points balance or how that balance will change as a result of the pending transaction.

In one embodiment, the web page 306 includes a "go back" button 321 that allows the user 104 to change his or her selection, e.g., to choose another payment instrument, loyalty card, rewards card, and/or promotion, after which the user 104 may return to the summary page shown in FIG. 3C.

In one embodiment, the web page 306 includes a "confirm payment" button 322 that, when activated, initiates or executes the pending transaction with the user's current selections.

In the embodiment illustrated in FIG. 3C, the web page 306 also includes buttons 308 and 310, the functions of which are the same as were described with reference to FIG. 3B. In one embodiment, using the button 308 to change the payment instrument to be used will cause the contents of sections 313, 314, 315, 316, 318, 319, and 320 to be updated, and possibly changed, accordingly. In this manner, the user 104 can determine the relative benefits of selecting one payment instrument over another payment instrument, selecting one set of L/R/P options over another set of L/R/P options, or some combination of the above. In the embodiment illustrated in FIG. 3C, for example, the number of loyalty points available for redemption and the dollar amount of store offers available to the user change depending on whether the Cool Pay Card is selected (on the left) or the Other Card has been selected (on the right). As a result, the total amount that the user will ultimately pay varies significantly in this example. By changing the card selected in button 308, the user can see for themselves how the numbers change.

To better show a comparison of the relative benefits of selecting one payment instrument (and/or one set of L/R/P options) over another, web page 306 may include a mode that allows a side-by-side comparison of data. An example of this is shown in FIG. 3D.

Figure 3D:
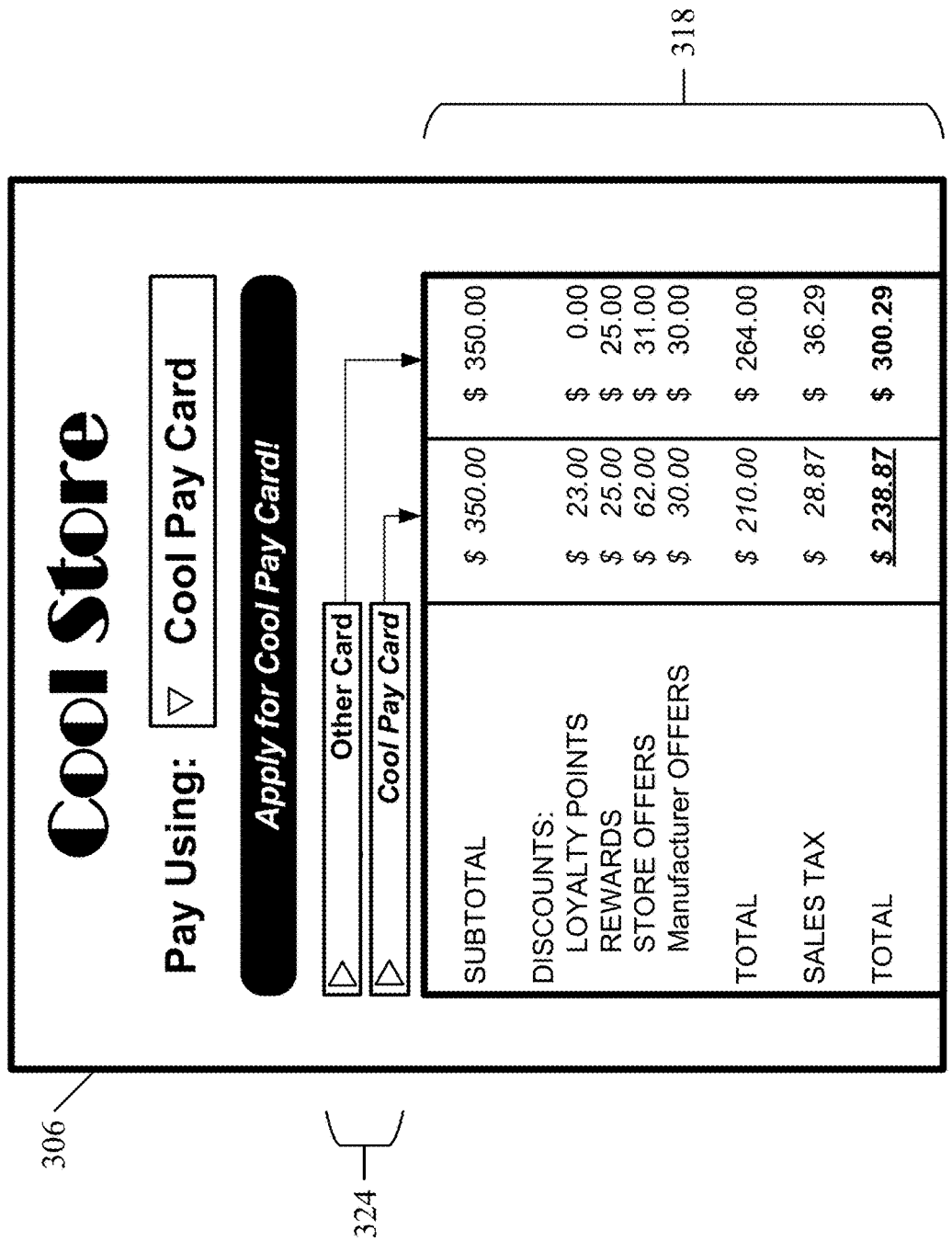

FIG. 3D illustrates how web page 306 may be used to display a side-by-side comparison of payment instrument and/or L/R/P selections to the user 104 according to an embodiment of the subject matter described herein. In one embodiment, the summary section 318 may show a side-by-side comparison of the benefits of using one payment instrument over another payment instrument. In the embodiment illustrated in FIG. 3D, for example, the summary section 318 includes a column on the right for showing the discounts that are available to the user 104 if he or she uses the Other Card, and a column in the middle for showing the discounts that are available to the user 104 is he or she uses the Cool Pay Card. By using pulldown selection boxes 324, the columns can be used to display the differences between different payment instruments, loyalty/rewards cards, sets of coupons or promotions, or other comparisons selected by the user 104. FIG. 3D illustrates an example in which the user 104 can pay a substantially lower price if he or she uses the merchant-branded "Cool Pay Card" instead of the regular credit card. Likewise, in one embodiment, web page 306 may have a mode that allows the user to compare two "dashboard" views, such as shown in FIG. 3B, side by side, to see how the options change based on the user's selection of payment instrument and/or L/R/P options.

Figure 3E:
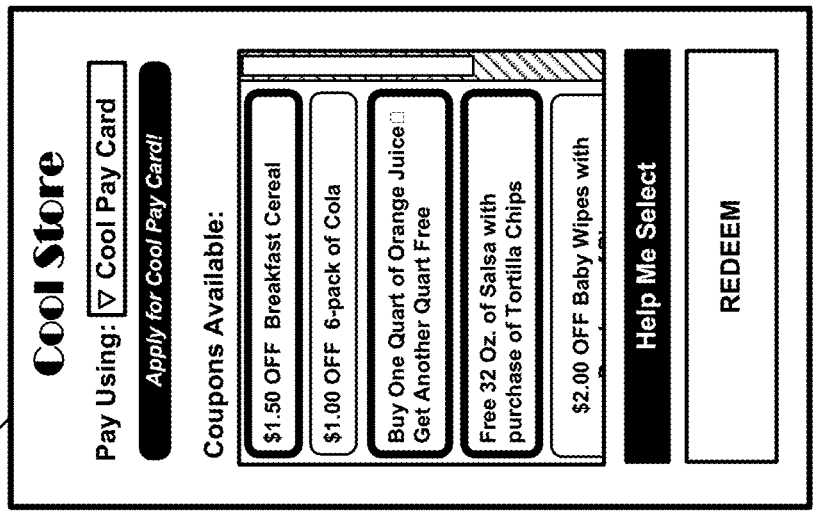

FIG. 3E illustrates how web page 306 may be used to redeem coupons, offers, and promotions according to an embodiment of the subject matter described herein. For simplicity and brevity the description will be made in terms of coupons and coupon redemption, but it will be understood that the same concepts apply also to offers, promotions, buy-one/get-one-free deals, and other incentives that may be available to the consumer.

In the embodiment illustrated in FIG. 3E, a coupon display area 326 shows coupons that are available for the user 104 to redeem. Coupon display area 326 may list coupons that the user 104 has previously collected and stored electronically in mobile device 106, and may include coupons that were sent to mobile device 106 from the RBE system 116 and/or the MBE server 102 at any time before, during, or after the shopping or checkout process. In one embodiment, during the shopping or checkout process, the mobile device 106, MBE server 102, and/or RBE system 116 may maintain a list items selected. For each item in the list, it is determined whether or not the user has or may be offered a coupon that pertains to that item, and if so, these coupons are brought to the attention of user 104, e.g., by causing them to be displayed in a list of pertinent coupons, by moving them to the top of a list of all coupons, by highlighting them in a list of all coupons, or by some other method.

In the embodiment illustrated in FIG. 3E, for example, coupon display area 326 includes a scrolling list of available coupons, some of which are selected (indicated by a thick border) and some of which are not selected (indicated by a thin border.) In one embodiment, the available coupons may be displayed but not selected until the user 104 explicitly does so. Alternatively, the available coupons may all be selected and the user 104 is expected to explicitly unselect those which he or she does not yet want to redeem or cash in.

In one embodiment, if the user 104 has multiple coupons that are mutually exclusive, RBE system 116, MBE server 102, and/or mobile device 106 may try to intelligently select the combination of coupons that best benefits the user 104. In the embodiment illustrated in FIG. 3E, for example, web page 306 includes a button 328 labeled "Help Me Select", "Select For Me", or similar, for invoking this function. In one embodiment, the parameters for what coupons "best benefit" the user may be defined by the user 104. Examples of benefits include, but are not limited to, paying the least total cost, getting the highest number of loyalty/rewards points, etc. In one embodiment, the user 104 may prioritize available benefits, such as indicating a desire to pay the least amount versus a desire to get the most loyalty or rewards points, etc. In one embodiment, the user 104 may override or change any automatically selected coupons.

In one embodiment, after the coupons are automatically and/or manually chosen, the user 104 may press a redeem button 330, which applies/redeems all selected coupons. In one embodiment, pressing the redeem button 330 also causes payment to automatically be initiated, using default settings, such as payment instrument and loyalty card to be used, or using settings that the user 104 previously chose or chose during the course of shopping and/or the checkout process. In this manner, the user need not press a payment button or make any other payment instruction at all.

It is noted that embodiments of the web page 306 as depicted in FIGS. 3A through 3E are illustrative and not limiting. Different information may be presented; the information presented may be presented in any arrangement, layout, or style; and the information may be presented using different types of graphic elements or controls. It is noted also that the screen or portions thereof may be scrolled horizontally or vertically to display additional elements, and that the screen or portions thereof may be resized or rotated. Selectable options may be presented using other controls; other visual or conceptual arrangements are contemplated. Some options may be mutually exclusive from each other, and likewise some options may be selected in combinations with other options, according to instructions or information provided by the RBE system 116, the MBE server 102, or other entity.

Figure 3F:
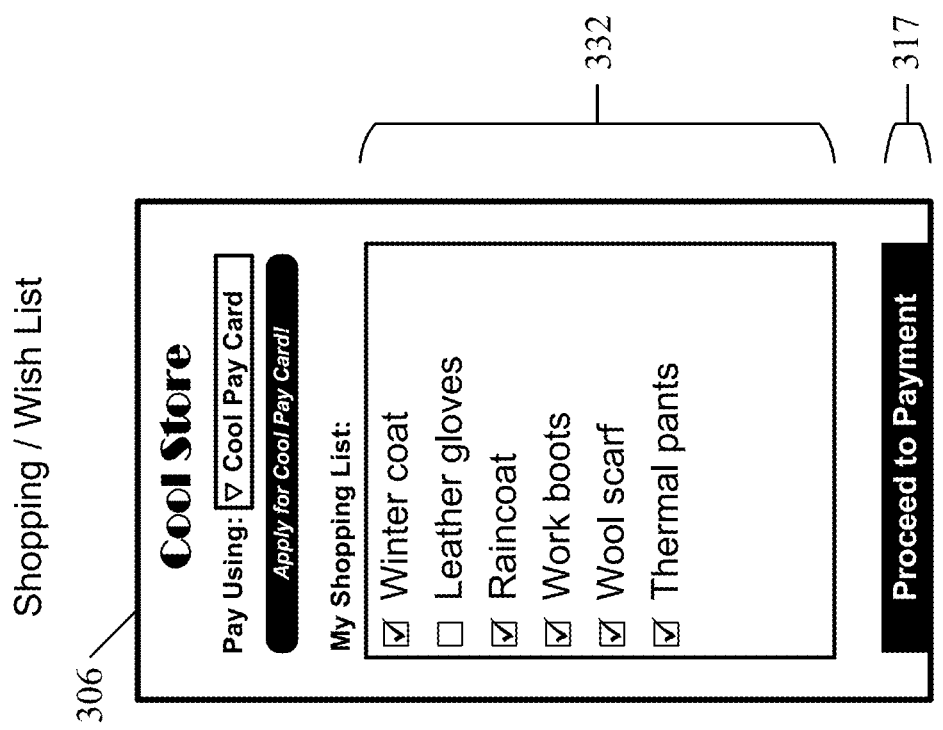
Figure 3G:
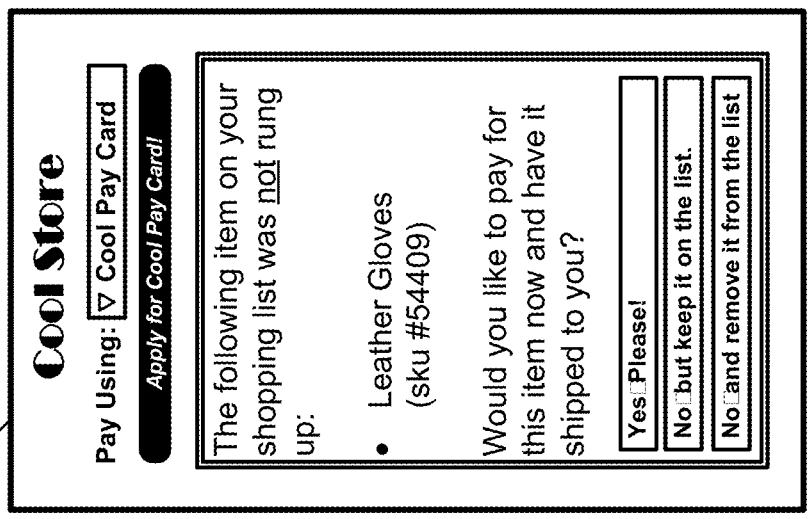

FIGS. 3F and 3G illustrate how web page 306 may be used to further enhance the user's shopping experience according to an embodiment of the subject matter described herein. In the embodiment illustrated in FIG. 3F, the user 104 may create a shopping list or wish list of items to be purchased, herein referred to as simply "the list". The list may be stored on the mobile device 106, on the MBE server 102, on the RBE system 116, on another entity entirely, or some combination of the above. In one embodiment, the user 104 may browse a retailer's online catalog and select items to be put into their list or another person's list. When the user 104 goes to the retailer's brick-and-mortar store, the mobile device 106 activates or retrieves the list. In one embodiment, the list may be used to aid the user 104 during the shopping and item selection process, e.g., the web page 306 may include a display area 332 for displaying the list to the user 104 and for allowing the user 104 to mark items from the list as they are found and placed into a shopping basket or cart.

In one embodiment, during the checkout process, the mobile device receives information about what items are being rung up at the POS terminal 112 and determines whether an item that was rung up is on the list or not. At the conclusion of the checkout process, if an item on the list was not rung up, the user 104 may be given the opportunity to go ahead and pay for the item at the time of checkout and have the retailer ship the purchased item directly to the user's home, e.g., from a warehouse or distribution center. An example of this is shown in FIG. 3G, which includes a pop-up message 334 that asks the user 104 if he or she would like to pay for one of the items on the list and have that items shipped to him or her. In the embodiment illustrated in FIG. 3G, the user 104 is given the option to pay for the item and have it shipped, to not purchase the item now but leave it on the list, or to not purchase the item now and remove it from the list.

Figure 4A:
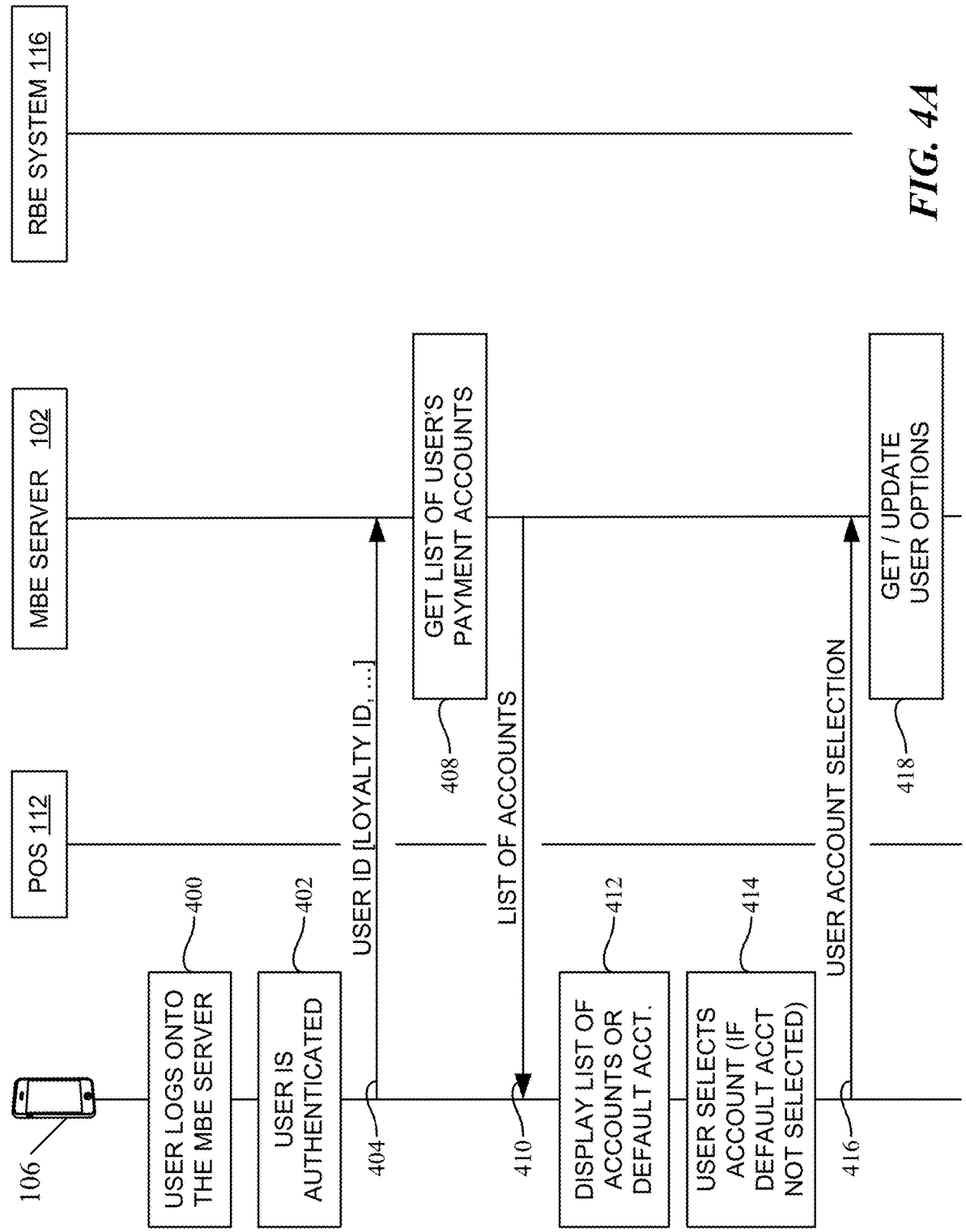
FIG. 4A illustrates a process or performing secure mobile payment and non-payment transactions with integrated loyalty, rewards, and promotions according to an embodiment of the subject matter herein.
Figure 4B:
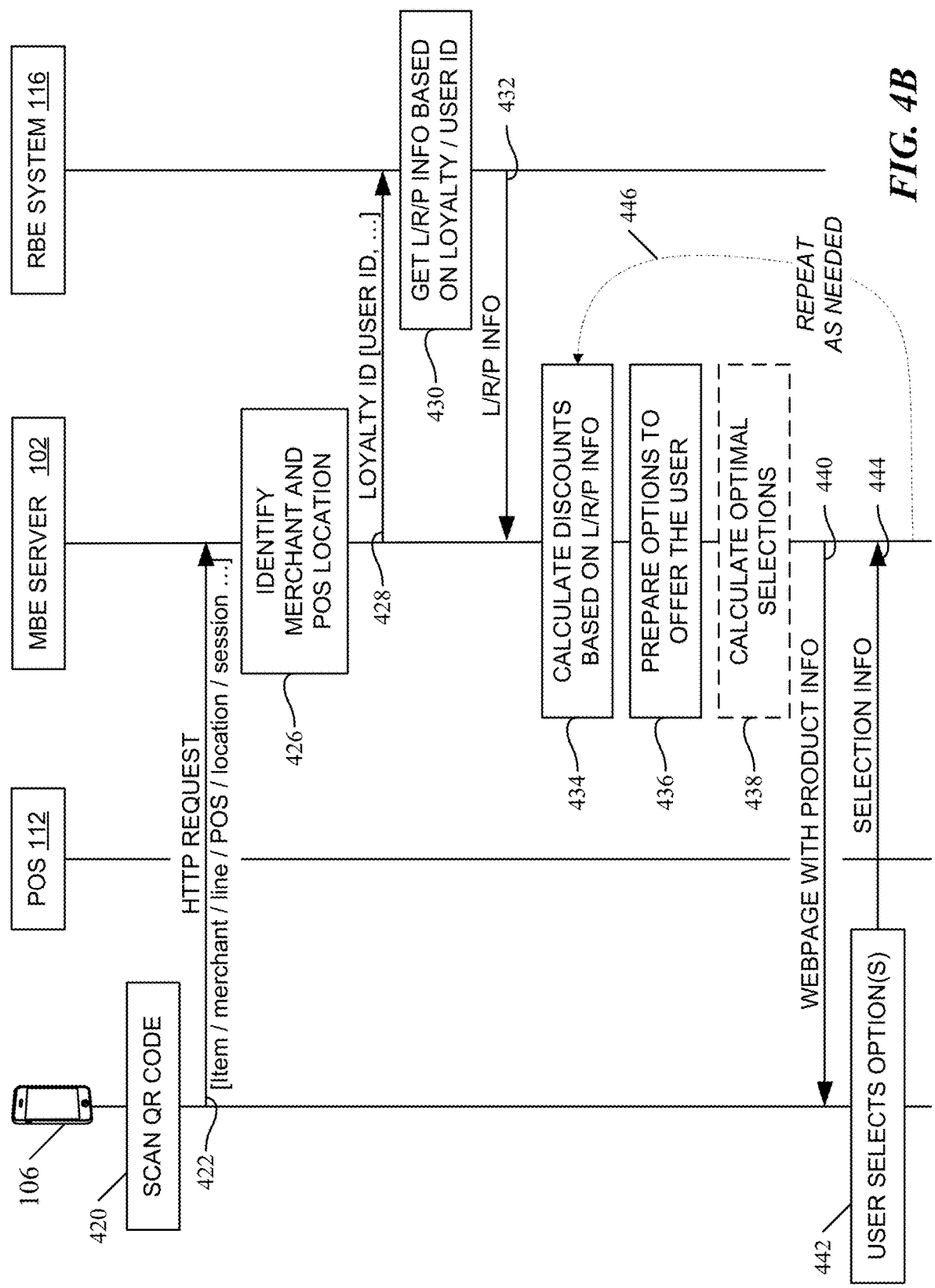
FIG. 4B illustrates a process or performing secure mobile payment and non-payment transactions with integrated loyalty, rewards, and promotions according to an embodiment of the subject matter herein.
Figure 4C:
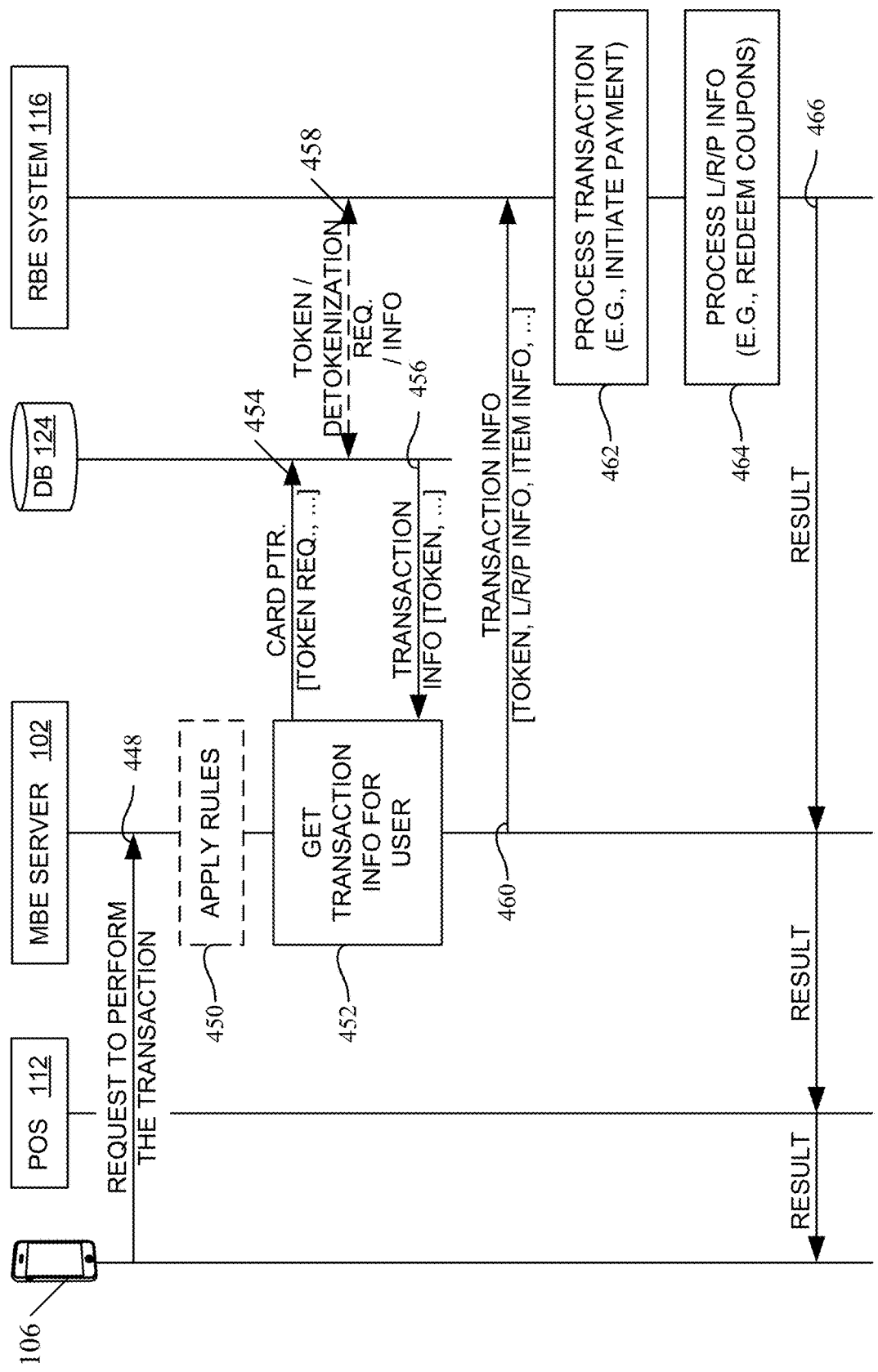
FIG. 4C illustrates a process or performing secure mobile payment and non-payment transactions with integrated loyalty, rewards, and promotions according to an embodiment of the subject matter herein.

FIGS. 4A, 4B, and 4C illustrate exemplary processes for performing secure mobile payment and non-payment transactions with integrated loyalty, rewards, and promotions according to an embodiment of the subject matter herein.

FIG. 4A illustrates the steps of the process that may occur prior to shopping and/or checkout. In the embodiment illustrated in FIG. 4A, the user 104 uses a mobile device 106 or other computer to log into the MBE server 102 (block 400). In one embodiment, the user is authenticated (block 402). If successful, the user connects with the MBE server 102 (message 404). In one embodiment, the MBE server 102 receives information that may be used to directly identify the user 104, such as a user ID, a loyalty ID, or information that may be used to indirectly identify the user 104, such as information that identifies the mobile device 106 or other information that is associated with the user 104 and can thus be used to identify the user 104.

In the embodiment illustrated in FIG. 4A, the MBE server 102 uses the information received in message 404 to get information associated with the user 104, such as a list of the user's payment accounts (block 408), which the MBE server 102 provides to the mobile device 106 (message 410). The list of accounts (or a default account, if configured) and optionally other information, is then displayed to the user 104 by the mobile device 106 (block 412). In an alternative embodiment, the mobile device 106 may maintain a list of the user's payment accounts, in which case steps 408 and 410 are not necessary and may not be performed.

In the embodiment illustrated in FIG. 4A, the user 104 may choose to select an account, whether or not a default account is selected (block 414), in which case the user's selection is conveyed to the MBE server 102 (message 416). Alternatively, one of the user's accounts may have previously been identified as a default payment account. In one embodiment, that information may be stored on the mobile device 106, in which case the notification message 416 may be sent even in the absence of an express user selection such as in block 414. In another embodiment, the MBE server 102 may store that information, in which case steps 414 and 416 need not be performed. FIG. 4A concludes with block 418, in which the MBE server 102 gets and/or updates the user's options in preparation for a transaction or other merchant interaction.

FIG. 4B illustrates the steps of the process that may occur during shopping and/or checkout. In the embodiment illustrated in FIG. 4B, the process begins when the user 104 uses his or her mobile device 106 to scan a QR code (block 420). The QR code may be presented by the POS terminal 112, in which case the data encoded within the QR code may identify the merchant, checkout line, POS terminal, location, session, etc. Alternatively, the QR code may be part of a product display, in which case the date encoded within the QR code may identify an item, a price, a discount, coupon, or other incentive, etc.

In the embodiment illustrated in FIG. 4B, the mobile device 106 decodes the QR code, which contains a URL of the MBE server 102. The mobile device's web browser then goes to that URL. The HTTP request (message 422) may include some or all of the QR information. The data encoded within the QR code may be encrypted, in plain text, or a combination of the two. Examples of other types of information that may be transmitted as part of the HTTP request include, but are not limited to: a name of the user 104; information that identifies the mobile device 106, which is associated with the user 104; information that identifies a loyalty or rewards account of the user; or other information that is associated with the user 104 and thus can be used to identify the user 104. Additional information may also be transmitted to MBE server 102, including, but not limited to, information that may be used to identify an item or items of interest, herein referred to as "the item information"; and other information that may be pertinent to authentication of the user, pertinent to the execution of the transaction generally, or pertinent for any other purpose.

In cases in which the user 104 is or will be making a POS transaction, the QR code may include information that identifies a particular POS terminal 112. This information is referred to herein as "the POS ID". In implementations where each POS terminal has a unique identifier that can be mapped to particular merchant, the QR code need only include the POS ID. Other types of information that may be included in the QR code include, but are not limited to, information about the location of the POS terminal 112 and checksum data for error correction and/or fraud detection purposes.

In cases in which the user 104 is browsing the ecommerce site 114, the QR code may be presented on the website, from which it may be scanned by the mobile device 106 (e.g., when the user 104 is browsing the ecommerce site 114 on a computer separate from the mobile device 106) or detected by the mobile device 106 (e.g., when the user 104 is using the mobile device 106 to browse the ecommerce site 114.) In these embodiments, the QR code 136 may include data that identifies the ecommerce session.

In one embodiment, the mobile device 106 is already provisioned to know the address of the MBE server 102. In an alternative embodiment, the address of the MBE server 102 may be determined by the mobile device 106 on an as-needed basis according to communications protocols known to one of skill in the art.

In one embodiment, the MBE server 102 may use the QR information to determine a loyalty ID for the user 104. For example, if the MBE server 102 receives the loyalty ID directly from the mobile device 106, it may simply use that information. On the other hand, if the MBE server 102 receives another form of user ID, the MBE server 102 may use the information received to query a database, such as database 124 in FIG. 1E, to look up the loyalty ID.

In the embodiment illustrated in FIG. 4B, the MBE server 102 uses the QR information to identify the merchant, the transaction terminal location, and optionally other information (block 426), so that it knows which RBE system 116 with which to communicate. An example of information that identifies a merchant directly is a merchant ID, or "MID". Once the MBE server 102 identifies the RBE system 116, it will then communicate with the RBE system 116 to determine what loyalty, rewards, and/or promotions options are available for that particular user 104. As used herein, the terms "L/R/P data" and "L/R/P information" are synonymously used to refer to the loyalty, rewards, and/or promotions data that is provided by the RBE system 116. It is noted that L/R/P data may include only loyalty data, only rewards data, only promotions data, or some combination of the three. In the embodiment illustrated in FIG. 4B, for example, the MBE server 102 sends information that identifies the particular user 104 to the RBE system 116 (message 428). The information so sent may be the loyalty ID, the user ID, or other information that the RBE system 116 may use to determine L/R/P data for the particular user 104 (block 430). This data is then provided to the MBE server 102 (message 432).

The L/R/P data is then used to determine what discounts, coupons, or other incentives may be provided to the user 104 so that he or she can make a wide variety of pre-transaction decisions, including, but not limited to, decisions about item selection, decisions about loyalty card selection or use, decisions about the accumulation or redemption of rewards points, decisions relating to retailer promotions, and decisions about payment instrument selection. Thus, in the embodiment illustrated in FIG. 4B, the MBE server 102 uses the received L/R/P information to calculate discounts and other benefits that the user 104 may select (block 434). It is noted that the step of calculating discounts may be performed by the MBE server 102, by the RBE system 116, by the mobile device 106, by the POS terminal 112, or some combination of the above. For clarity of explanation, however, this step is shown in FIG. 4B as occurring only at the MBE server 102, but the subject matter described herein is not so limited.

In the embodiment illustrated in FIG. 4B, the MBE server 102 prepares options to offer the user (block 436). For example, the L/R/P information received in message 432 may include rules or other conditions that dictate when certain incentives are to be made available to the user 104 and when they are not. Where certain incentives are available only if the user 104 intends to use a particular payment instrument, for example, the MBE server 102 may need to take these conditions and limitations into account while it prepares the options to offer the user (block 436).

In one embodiment, the MBE server 102 may optionally attempt to further simplify the potentially bewildering array of options available to the user 104 by analyzing the available options and attempting to calculate the combination of options that most benefits the user 104, possibly based on parameters defined for that purpose by the user 104. Thus, in the embodiment illustrated in FIG. 4B, the MBE server 102 calculates optional selections (block 438).

In the embodiment illustrated in FIG. 4B, a webpage, such as a product display page, is generated and sent to the mobile device (message 440). Using the generated webpage, the user 104 can then review the available options and make one or more selections (block 442), and the MBE server 102 is notified of the user' selection or selections, herein referred to as "the selection information" (message 444). The selection information 444 may include many kinds of information, including, but not limited to: information that identifies a payment instrument; information that identifies a loyalty card, account, or program; information that identifies a rewards card, account, or program; and information that identifies a promotion.

In one embodiment, the particular selection(s) made by the user 104 may generate additional options that the user 104 may want to consider or otherwise have an effect on the options that are then available to that user 104. Thus, in the embodiment illustrated in FIG. 4B, the process may return to block 434, iterating as many times as needed to ensure that the user 104 has the information and the opportunity to maximize his or her benefits from the loyalty, rewards, and promotions that are available to him or her. This is indicated in FIG. 4A by the dotted arrow 446, which has the label "repeat as needed". Although not shown in FIG. 4B, in one embodiment, the iteration represented by arrow 446 may involve additional interaction between the MBE server 102 and the RBE system 116, e.g., to get additional L/R/P information based on the user's selection information. Once the user 104 is satisfied with the selection and wants to proceed to payment, the process continues on FIG. 4C.

FIG. 4C illustrates the steps of the process that may occur during the checkout process. In the embodiment illustrated in FIG. 4C, the user 104 indicates a desire to conclude the transaction, e.g., by clicking on a "Buy Now" button on the generated webpage, and in response, the mobile device 106 sends to the MBE server 102 a request to perform the transaction (message 448). In one embodiment, the MBE server 102 may optionally apply rules (block 450) that govern the allowed behavior of the user's 104 payment instruments, e.g., so as to verify that the requested transaction is allowed, for example. Because the MBE server 102 can maintain sensitive information related to electronic payments, for example, the MBE server 102 is uniquely positioned to store and apply user-defined rules that control which users can and cannot engage in such transactions, which payment instruments they can or cannot use, and other restraints upon transactions including spending caps, and so on.

In the embodiment illustrated in FIG. 4C, assuming that the transaction is authorized, the MBE server 102 uses the selection information to get payment information for the user 104 (block 452). In one embodiment, the MBE server 102 queries its secure database 124 to retrieve payment information or other sensitive information to be used for the desired transaction. In the embodiment illustrated in FIG. 4C, for example, the MBE server 102 sends to the database 114 a request (arrow 454) that includes information which can be used to query the database 124.

In one embodiment, the request can include information that may be used to identify a particular credit card, debit card, or other payment instrument, herein referred to as "a card pointer". In one embodiment, the card pointer may be a number that operates as an index, key, or pointer into a database or array, etc. Alternatively, the card pointer may be a descriptive string, such as "AmEx" or "Visa1" or "Dad's Credit Card", or even a random string of characters. The use of a pointer with no inherent payment information to query the database 124 provides an additional layer of protection against "man in the middle" attacks between a POS terminal/ecommerce website and the MBE server 102: an unauthorized viewer might see that the user 104 wants to use a MasterCard credit card, but does not see any information from which the actual account information could be reconstructed. The database 124 responds to this request by providing the transaction information (message 456). If the transaction is a payment, for example, the transaction information may include payment information. Non-payment transactions are also contemplated.

In another embodiment, the MBE server 102 may issue a request for a token, which the database 124 provides. A token is typically used to represent a payment transaction, but tokens may also be used to represent non-payment transactions as well. In one embodiment, the MBE server 102 or the database 124 may communicate with the RBE system 116 to request that a token be generated or to communicate information related to the token generation or use, or for some other purpose (message 458).

In the embodiment illustrated in FIG. 4C, the MBE server 102 sends the transaction information to the RBE system 116 (message 460). In one embodiment, the MBE server 102 may send other information. For example, the MBE server 102 may send some L/R/P data to the RBE system 116, so that the RBE system 116 will know which loyalty card was used, what rewards activity will occur (e.g., whether points were purchased or redeemed), and which promotions were taken advantage of by the user 104. This allows the RBE system 116 to track user purchases, purchase history, purchase habits, and preferences, which may be used to tailor advertisements and promotions to each particular user.

In the embodiment illustrated in FIG. 4C, the RBE system 116 processes the transaction (block 462). For a payment transaction, this may involve initiating payment, such as interaction with a payment network, bank, or other financial entity. Non-payment transactions, including, but not limited to, updating L/R/P information for a particular user, are also contemplated.

In the embodiment illustrated in FIG. 4C, the RBE system 116 may also process L/R/P data (block 464). For example, the RBE system 116 may automatically process coupons at the time of purchase, which is especially attractive for retailers who sell products for which there is a manufacturer's rebate, because the RBE system 116 can automatically issue to the manufacturer requests for reimbursement. Automatic processing of manufacturer's rebates avoids the time and expense of traditional manual methods, and reduces the number of rebates that the retailer cannot take advantage of due to data entry error or lost coupons.

In the embodiment illustrated in FIG. 4C, the result(s) of the transaction(s) may be conveyed to the user 104, directly or indirectly through the MBE server 102, the POS terminal 112, the mobile device 106, or some combination of the above (message 466). For example, the user 104 may receive, via the mobile device 106, a text message that includes a transaction receipt.

In this manner, the system 100 provides a mechanism by which a merchant can interact with a consumer long before the last step of payment. For example, the user 104 may use the mobile device 106 to scan a QR code printed on or near an item of interest to get information about that item. The MBE server 102 can detect this interaction and provide the merchant the opportunity to determine who the user 104 is, to determine whether or not the user 104 is a loyalty or discount club member, and, if so, to notify the user 104 via the mobile device 106 or a dynamic display near the item, that there is a lower price for club members. The user 104 may be notified, via mobile device 106 or other means, that selecting one payment instrument (e.g., a credit card issued by the merchant, for example) may result in even greater discounts, rewards, points, entries into drawings or giveaways, etc. The user may be given an opportunity to redeem reward points for discounts or prizes. This information may be provided to the user 104 via the mobile device 106, via the POS terminal 112 or ecommerce site 114, or via some combination of the above. In this manner the user 104 has the opportunity to choose a discount, loyalty card, payment instrument, etc., while standing in front of the POS terminal 112, for example. The ability to engage in significant prepayment activity allows the merchant to provide the customer with a richer, multi-dimensional transaction experience, to the benefit of both.

Convenience. System 100 makes possible a wide range of transactions that can be performed using mobile device 106 without the overhead of a secure connection to and from mobile device 106. In one example, a user who is shopping on an ecommerce site 114 and desires to start the checkout process to complete the purchase may select a "pay now" option displayed on the ecommerce site. In one embodiment, a QR code that includes information about the transaction (or information that may be used to retrieve information about the transaction) may be displayed on the ecommerce website checkout screen, which the user scans using mobile device 106. Mobile device 106 then may decode the QR code and send the decoded information to the MBE server 102. The MBE server 102 may then query a database to get entity-defined or user-defined preferences and rules that may determine whether the desired transaction will be allowed or not allowed, whether a notification or alert will be sent or not sent, or other specific behaviors and capabilities for specific transactions and/or accounts as defined by the user.

If the transaction is allowed, the MBE server 102 may then query the database to retrieve the pertinent account information and use that information to perform or initiate the desired transaction. Examples of an account of the user include, but are not limited to, a card payment account or a non-card, cardless, or virtual card account, a payment account; a credit, debit, or prepaid account; a branded account; a retailer or private label account; a gift or gift card account, a loyalty account; a healthcare or wellness account; an access account; a membership account; or a rewards account.

In another example, a user may desire to use mobile device 106 to perform or complete a secure financial transaction at a physical store, in which case point of interaction may be POS terminal 112. In this scenario, POS terminal 112 may transmit information over insecure channel 110 to mobile device 106, which communicates a preference for a payment type to the MBE server 102 over another insecure channel 110. The MBE server 102 provides the sensitive information needed to perform the financial transaction to POS terminal 112 over a secure backend channel 108.

Mobile device 106 may be used to provide secure authentication of the user/account owner, such as via the use of passwords, passcodes, personal identification numbers (PINs), biometrics, social networking, physical location, etc. In this scenario, authentication information (or proof of successful authentication) may be conveyed to the MBE server 102, which may then allow the desired electronic transaction.

Where the desired transaction is a financial transaction, in one embodiment, the MBE server 102 may determine, based on the application of the user-defined rules, that the transaction is allowed. In this scenario, the MBE server 102 may then retrieve confidential information, such as payment details, from a database, from secure datastore 118, or from some other datastore, and send that information to a payment transaction network that handles the transfer of funds from the user's account in one bank to the merchant's account in another bank, for example.

Examples of the information associated with the desired transaction include, but are not limited to, information about a type of the transaction, an amount of the transaction, a party to the transaction, a time of the transaction, a location of the transaction, and a good, service, or subject of the transaction.

In one embodiment, the mobile backend server receives the information associated with a desired transaction from a mobile device of the user.

In one embodiment, the mobile device of the user may receive the information associated with the desired transaction from a user of the mobile device, a point of sale terminal, an ecommerce website, or the mobile backend server.

In one embodiment, the mobile device of the user receives the information associated with the desired transaction via scanning and decoding QR code that encodes at least some of the information.

In one embodiment, the mobile device of the user receives the information associated with the desired transaction via NFC.

Examples of transactions include, but are not limited to, transactions made using a physical point of sale terminal, transactions made online or via an ecommerce website, and transactions made using a mobile device.

In one embodiment, the entity-defined or user-defined preferences that control behaviors and capabilities of the entity's accounts and/or account transactions on a per-user basis may include a preference related to an account.

Examples of a preference related to an account include, but are not limited to: an active/enabled or inactive/disabled state the account; a restriction on use of the account involving a user or class of users; a restriction on use of the account involving a merchant or class of merchants; a restriction on a transaction involving an ecommerce site or class of ecommerce sites; a restriction on a transaction involving a point of sale terminal or class of point of sale terminals; a restriction on use of the account for a good or class of goods; a restriction on use of the account for a service or class of services; a temporal restriction on use of the account; a geographical restriction on use of the account; a restriction on a class of accounts; a restriction on an amount or range of amounts allowed per transaction; a restriction on an amount or range of amounts allowed per a period of time; a restriction on a type of device used to perform the transaction; an ability to transfer funds to or from the account; an ability to transfer control of the account; an ability to create a sub-account; an ability of the account to be shared by multiple users; and any combination of the above.

In one embodiment, the entity-defined or user-defined preferences that control behaviors and capabilities of the entity's accounts and/or account transactions on a per-user basis may include a preference related to a transaction.

Examples of a preference related to a transaction include, but are not limited to: a restriction on a type of transaction; a restriction on a transaction involving a user or class of users; a restriction on a transaction involving a merchant or class of merchants; a restriction on a transaction involving an ecommerce site or class of ecommerce sites; a restriction on a transaction involving a point of sale terminal or class of point of sale terminals; a restriction on a transaction for a good or class of goods; a restriction on a transaction for a service or class of services; a temporal restriction on transactions; a geographical restriction on transactions; a restriction on a transaction for an amount limit or range of amounts; a restriction on a type of device used to perform the transaction; a restriction on a transaction's recurrence; and any combination of the above.

In one embodiment, the entity-defined or user-defined preferences that control behaviors and capabilities of the entity's accounts and/or account transactions on a per-user basis may include an application of an entity-defined or user-defined preference.

Examples of application of an entity-defined or user-defined preference include, but are not limited to: imposition of a user's favored preference, prohibition of a user's disfavored preference, selection of a user's most favored preference of those available for a particular transaction, and selection of a user's most favored preference of those available for a particular account.

Examples of an entity-defined or user-defined preference include, but are not limited to, a shipping preference, a level or type of authentication to be required for the transaction or account, a level of type authorization to be required for the transaction or account, and a level of type notification of the occurrence of a transaction or account.

In one embodiment, the entity-defined or user-defined preferences that control behaviors and capabilities of the entity's accounts and/or account transactions on a per-user basis may include a preference related to a condition.

Examples of a preference related to a condition include, but are not limited to, a preference related to a condition of the transaction, a preference related to a condition of the account, a preference related to a condition of the user, or any combination of the above.

In one embodiment, a user or other entity with administrative privileges can control behaviors and capabilities of the entity's accounts or account transactions as applied to another user.

Examples of the transaction or account information include, but are not limited to, an account name, an account number, an account issuing bank, a user name, a user physical address, a user shipping address, identification information for identifying a user, and authentication information for authenticating a user.

Examples of a transaction of the user include, but are not limited to, a payment or purchase, a credit transaction, a debit transaction, a deposit, a withdrawal, a money transfer, a transaction involving a loyalty program, a transaction involving a rewards program, and a transaction involving a diet, health, or fitness program.

Examples of an account of the user include, but are not limited to, a card payment account, and a non-card, cardless, or virtual card account.

Examples of an account of the user include, but are not limited to, a payment account, a credit, debit, or prepaid account, a branded account, a retailer or private label account, or a gift or gift card account.

Examples of an account of the user include, but are not limited to, a loyalty account, a healthcare or wellness account, an access account, a membership account, or a rewards account.

In one embodiment, applying user-defined preferences to the user's transactions includes receiving information associated with a desired transaction, determining a user associated with the desired transaction, determining a user account associated with the user, determining a user-defined preference for the desired transaction, for the user account, or both, and applying the user-defined preference to modify a behavior or capability of the desired transaction, user account, or both.

Examples of the information associated with the desired transaction include, but are not limited to, a type of the transaction, an amount of the transaction, a party to the transaction, a time of the transaction, a location of the transaction, and a good, service, or subject of the transaction.

In one embodiment, the mobile backend server receives the information associated with a desired transaction from a mobile device of the user. The mobile device of the user may have received the information associated with the desired transaction from a user of the mobile device, a point of sale terminal, an ecommerce website, or the mobile backend server.

In one embodiment, the mobile device of the user receives the information associated with the desired transaction via scanning and decoding QR code that encodes at least some of the information.

In one embodiment, the mobile device of the user receives the information associated with the desired transaction via NFC.

Examples of the transactions include, but are not limited to, transactions made using a physical point of sale terminal, transactions made online or via an ecommerce website, and transactions made using a mobile device.

In one embodiment, the entity-defined or user-defined preferences that control behaviors and capabilities of the entity's accounts and/or account transactions on a per-user basis may include a preference related to an account.

Examples of a preference related to an account include, but are not limited to: an active/enabled or inactive/disabled state the account, a restriction on use of the account involving a user or class of users, a restriction on use of the account involving a merchant or class of merchants, a restriction on a transaction involving an ecommerce site or class of ecommerce sites, a restriction on a transaction involving a point of sale terminal or class of point of sale terminals, a restriction on use of the account for a good or class of goods, a restriction on use of the account for a service or class of services, a temporal restriction on use of the account, a geographical restriction on use of the account, a restriction on a class of accounts, a restriction on an amount or range of amounts allowed per transaction, a restriction on an amount or range of amounts allowed per a period of time, a restriction on a type of device used to perform the transaction, an ability to transfer funds to or from the account, an ability to transfer control of the account, an ability to create a sub-account, an ability of the account to be shared by multiple users, and any combination of the above.

In one embodiment, the entity-defined or user-defined preferences that control behaviors and capabilities of the entity's accounts and/or account transactions on a per-user basis may include a preference related to a transaction.

Examples of a preference related to a transaction include, but are not limited to: a restriction on a type of transaction, a restriction on a transaction involving a user or class of users, a restriction on a transaction involving a merchant or class of merchants, a restriction on a transaction involving an ecommerce site or class of ecommerce sites, a restriction on a transaction involving a point of sale terminal or class of point of sale terminals, a restriction on a transaction for a good or class of goods, a restriction on a transaction for a service or class of services, a temporal restriction on transactions, a geographical restriction on transactions, a restriction on a transaction for an amount limit or range of amounts, a restriction on a type of device used to perform the transaction, a restriction on a transaction's recurrence, and any combination of the above.

In one embodiment, the entity-defined or user-defined preferences that control behaviors and capabilities of the entity's accounts and/or account transactions on a per-user basis may include an application of an entity-defined or user-defined preference.

Examples of application of an entity-defined or user-defined preference include, but are not limited to: imposition of a user's favored preference, prohibition of a user's disfavored preference, selection of a user's most favored preference of those available for a particular transaction, and selection of a user's most favored preference of those available for a particular account.

Examples of an entity-defined or user-defined preference include, but are not limited to: a shipping preference, a level or type of authentication to be required for the transaction or account, a level of type authorization to be required for the transaction or account, and a level of type notification of the occurrence of a transaction or account.

In one embodiment, the entity-defined or user-defined preferences that control behaviors and capabilities of the entity's accounts and/or account transactions on a per-user basis may include a preference related to a condition.

Examples of a preference related to a condition include, but are not limited to, a preference related to a condition of the transaction, a preference related to a condition of the account, a preference related to a condition of the user, or any combination of the above.

Advantages. The methods and systems described herein provide a number of distinct advantages over conventional systems. By digitally connecting the shopper application to the POS terminal or ecommerce site during the checkout but before making the payment, a retailer is able to establish personalized interaction with the shopper during the checkout process. The methods and systems described herein deliver a seamless checkout experience with integrated loyalty, rewards, and promotions. Both the consumer and the retailer benefit from the rich set of incentives that are made possible by the methods and systems described above, including instant issuance of charge card payment at checkout.

The methods and systems described herein enable on-the-spot transactions anywhere—no POS terminal or cash register is needed. By transmitting information about products and services to the consumer's mobile device (via QR codes, for example) customers will be able to make instant purchases and pay from anywhere in the store. The same underlying mechanism can be applied to any kind of transaction—including in-store, in-aisle, self-checkout, online, in-app, conventional POS checkout, and home delivery—to deliver a consistent payment experience across all sales channels.

The methods and systems described herein allow customers to individually configure a retailer's charge card as a family card to be used instantly by another family member with defined purchasing limitations. The user can flexibly manage all payment types, including: loyalty and marketing; retailer charge cards, prepaid gift cards, and ACH transactions; branded debit cards, prepaid/gift, and credit cards; and integrated loyalty, rewards, coupons, deals, and promotions; all personalized and in real-time.

The cloud-based mobile payment platform using HCE and tokenization means that: there is no longer a requirement that the mobile device include a secure element; card credentials don't touch the mobile device, the POS, or the ecommerce site; the token may be changed for every transaction, for both cards and ACH transactions; and the system is scalable to a wide variety of mobile devices. The cloud-based mobile platform supports multi-factor user authentication, including, but not limited to, authentication based on the user, the device, an address, the card issuer, a driver's license (e.g., with selfie photo), a passcode, fingerprint recognition, facial recognition, voice print recognition, and other biometric information. The cloud-based mobile platform can deliver a cardholder present (CHP) payment transaction based on multi-factor user authentication through the user's mobile device, which is a lower risk transaction than a card not present (CNP) transaction, allowing for a lower transaction fee. For at least all of the reasons just stated, the methods and systems described herein can prevent or drastically lower the possibility of counterfeiting, skimming, card stolen, and/or card loss transaction fraud.

The example embodiments described herein are intended to be illustrative and not limiting. It is important to note that the order of the actions and messages described above are for illustration only and are not intended to be limiting. Furthermore, embodiments having additional steps or fewer steps are also within the scope of the subject matter described herein. Entities shown in block diagrams may be a single physical entity or multiple physical entities, which may be co-located or geographically diverse. The division of labor between certain entities is also illustrative and not limiting; functions attributed to one or more entity may be performed by another entity or entities instead. Those skilled in the art will recognize improvements and modifications to the preferred embodiments of the present disclosure. All such improvements and modifications are considered within the scope of the concepts disclosed herein and the claims that follow.

Example Dataflows

PCT Patent Application No. PCT/US2019/046916, filed Aug. 16, 2019, which is incorporated by reference herein, includes example screen shots and data flows for a system in which a transaction is triggered by an advertisement. The same concepts disclosed in that document may be reused in for the present disclosure, with the modification that, instead of being triggered by an advertisement, the process may be triggered by scanning a QR code generated by a merchant, such as is described above. This document is included to illustrate example dataflows between a user, an Omnyway server (referred to as the "Omnyway Backend"), a merchant (referred to as the "Retailer"), and a payment provider (e.g., a credit card or debit card issuer, such as a bank). The signaling messages between these entities can be substantially reused for the methods and systems for merchants or service providers to engage shoppers in or near their physical stores using cloud based app(s) only, without requiring their shoppers to download a specific mobile app, of the present disclosure. An example is shown in FIGS. 5A-5B.

Figure 5A:
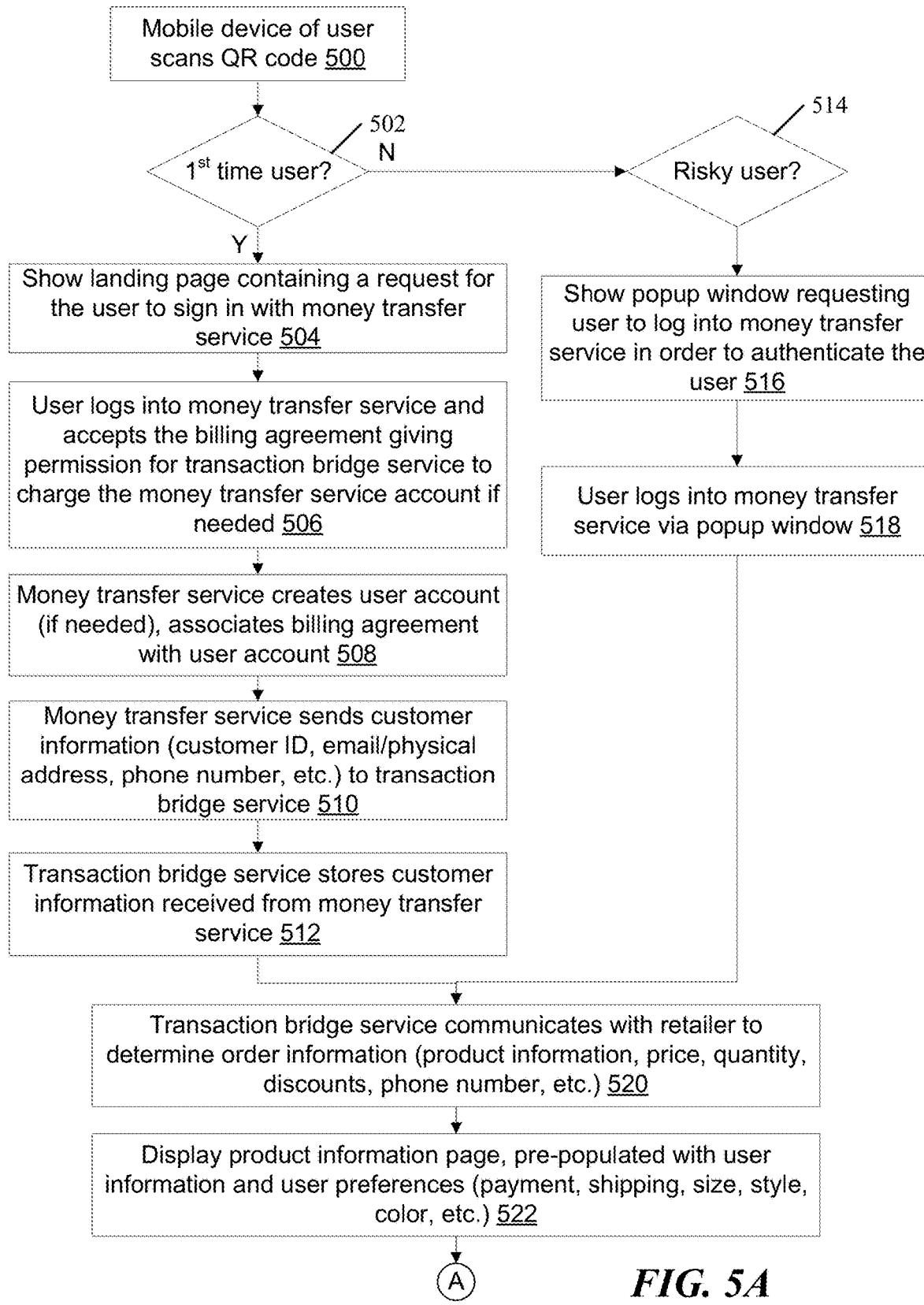
FIGS. 5A and 5B are flowcharts illustrating example flows in flowchart form rather than in as signaling diagrams.
Figure 5B:
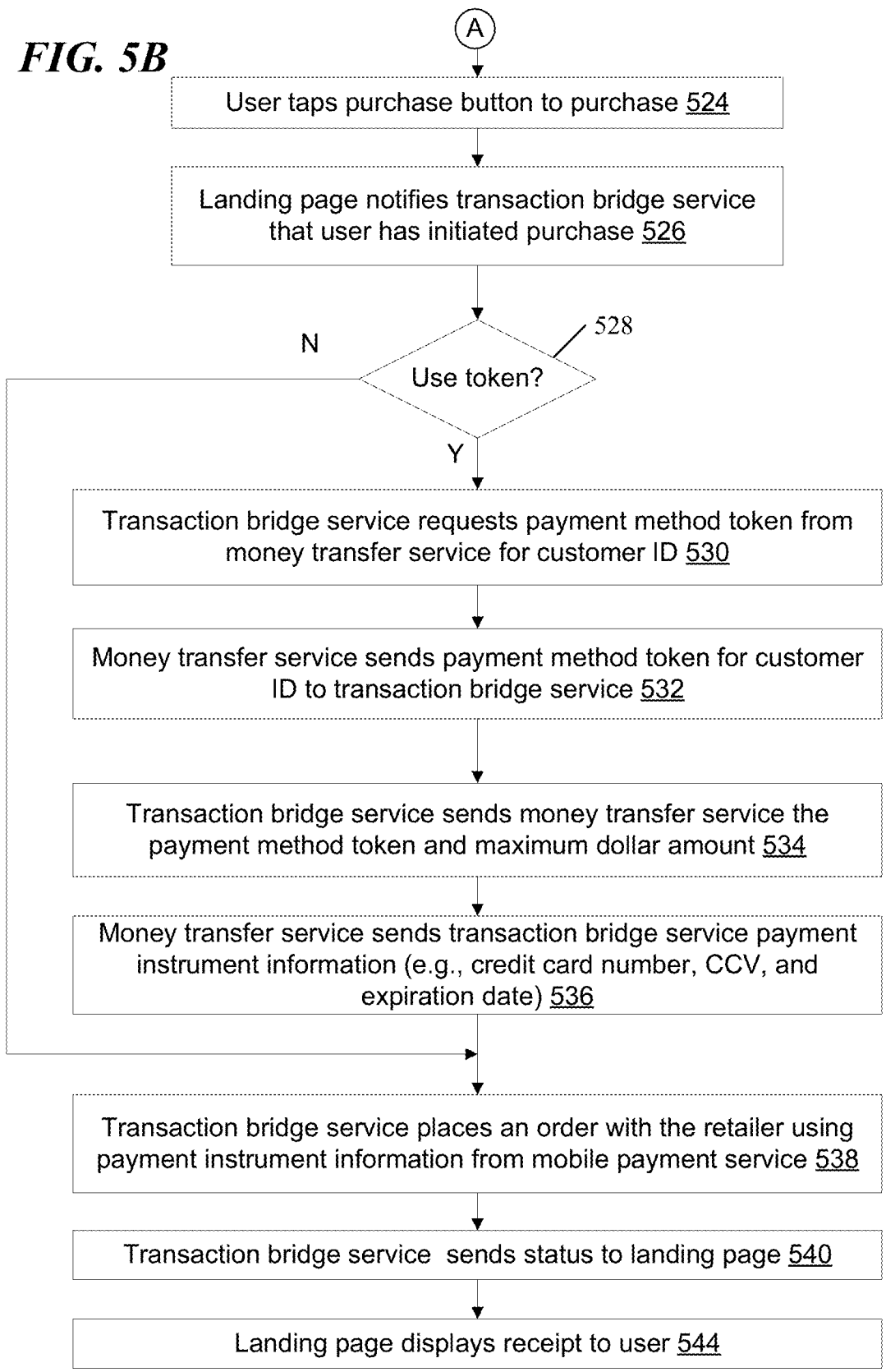

FIGS. 5A and 5B are flowcharts illustrating example flows in flowchart form rather than as signaling diagrams. In the embodiment illustrated in FIG. 5A, the process starts when a user device scans a QR code (step 500), It is determined whether the user of the mobile device is a first time user of a transaction bridge service provided by a transaction bridge server (e.g., transaction bridge server 3 of FIG. 1A, transaction bridge system 30 of FIG. 1B, transaction bridge mobile backend server (also referred to as MBE) 102 of FIG. 1E, etc.) or a returning user (step 502). Note that transaction bridge server 3 of FIG. 1A, transaction bridge system 30 of FIG. 1B, and transaction bridge mobile backend server (also referred to as MBE) 102 of FIG. 1E all refer to the same entity in embodiments.

If the user is a first time user of the transaction bridge service, the user is shown a landing page containing a request for the user to sign in with a money transfer service (e.g., Paypal® or Venmo®) (step 504). The user logs into the money transfer service (and signs up for a money transfer service account if the user does not already have an account), and accepts a Billing Agreement that gives the transaction bridge service permission to charge to the money transfer service account as part of a transaction (step 506). If needed, the money transfer service creates a user account, and associates the billing agreement with the user (step 508). The money transfer service sends customer information (e.g. customer ID, money transfer service ID, the user's email address, the user's physical address, the user's phone number, etc.) to the transaction bridge service (e.g., to the MBE backend 102) (step 510), which the transaction bridge service stores (step 512). The process then goes to step 520, which will be described below.

If, at step 502, it is determines that the user is a returning user, it is next determined whether the returning user is a high-risk money transfer service user (step 514). If so, the user will be presented with a popup window (or other message) that requests the user to log into the money transfer service (step 516). This is done in order to authenticate the money transfer service user. The user logs into the money transfer service via the login window and is thus authenticated (step 518), and the process goes to step 520. If, at step 514, it is determined that the returning user is not a high-risk money transfer service user, the steps 516 and 518 may be skipped.

At step 520, the transaction bridge service (e.g., MBE server 102) communicates with the retailer to determine order information (e.g., product information, price, quantity, discounts, the buyers shipping address and telephone number, etc.), and at step 522, the user is presented with a product details page (PDP) that is pre-populated with user information and user preferences (payment option, shipping address, size, style, color, etc.) such that the user need only click a button on the PDP to initiate the purchase. The process continues in FIG. 5B.

Referring now to FIG. 5B, the user clicks the button (taps the icon, etc.) to initiate the purchase (step 524). The landing page notifies the transaction bridge service (e.g., MBE 102) that the user has initialed a purchase (step 526). It is determined whether the payment information involves the use of a token (step 528), and if so, the transaction bridge service (e.g., MBE 102) makes a request for a payment method token associated with an indicated customer ID from the money transfer service (e.g., to a server of the money transfer service) (step 530), and the money transfer service (e.g., server of the money transfer service) sends to the transaction bridge service (e.g., MBE 102) a payment method token that is associated with the customer ID (step 532). The transaction bridge service (e.g., MBE 102) sends to the money transfer service (e.g., server of the money transfer service) the payment method token and specifies a maximum dollar amount and a time limit (e.g., three seconds) (step 534), and the money transfer service (e.g., server of the money transfer service) sends to the transaction bridge service (e.g., MBE 102) payment instrument information, e.g., credit card number, CCV, and expiration date (step 536). The process then goes to step 538, which is described below.

If at step 528, it is determined that a token is not to be used, the process skips steps 539, 532, 534, and 536, and goes directly to step 538. In step 538, the transaction bridge service (e.g., MBE 102) places an order with the retailer using the payment instrument information received from the money transfer service (e.g., the server of the money transfer service).

The transaction bridge service (e.g., MBE 102) then reports the status of the order, e.g., by sending it to the landing page (step 540), and the landing page displays a receipt to the user (step 542).

FIGS. 6A-6E illustrate an example video stream-based purchasing experience, in accordance with an embodiment of the present disclosure. The video stream-based purchasing experience can be performed from a computing device (e.g., a mobile computing device) that does not have an activated or installed payment application (e.g., does not have a mobile payment application installed thereon or does not include a mobile payment application that has been activated) and is performed using the methodologies and techniques described herein above.

Figure 6A:
FIGS. 6A-6E illustrate an example video stream-based purchasing experience, in accordance with an embodiment of the present disclosure.

FIG. 6A illustrates a landing page that is loaded by a web page of the consumer's computing device (e.g., mobile web browser) after clicking a URL link received by the consumer. The URL link may have been received from a touchpoint as described above. After accessing the URL link (e.g., clicking on the URL link), the web browser loads the landing page and may enter a product event. At the landing page, the consumer may enter their name, email address, phone number and/or other personal information to generate a new account. If the consumer already has an account, the landing page may be skipped.

Figure 6B:

Once the user has a user account, the web page begins receiving a video stream of one or more products and/or services that can be purchased, as shown in FIG. 6B. If the consumer was already known (e.g., has an account that the web browser may automatically log into), the landing page of FIG. 6A may be skipped, and the web page may load the web page with the video stream. The web page with the video stream may include a chat bar that the consumer may type questions into to interface with a merchant of a shown product/service. A list price and/or discounted event price for the displayed product/service may be listed in the web page along with information about the product/service, such as colors, size, patterns, options, and so on. A "Bag" button may also be included in the web page, which the consumer may press to purchase the shown product/service.

Figure 6C:
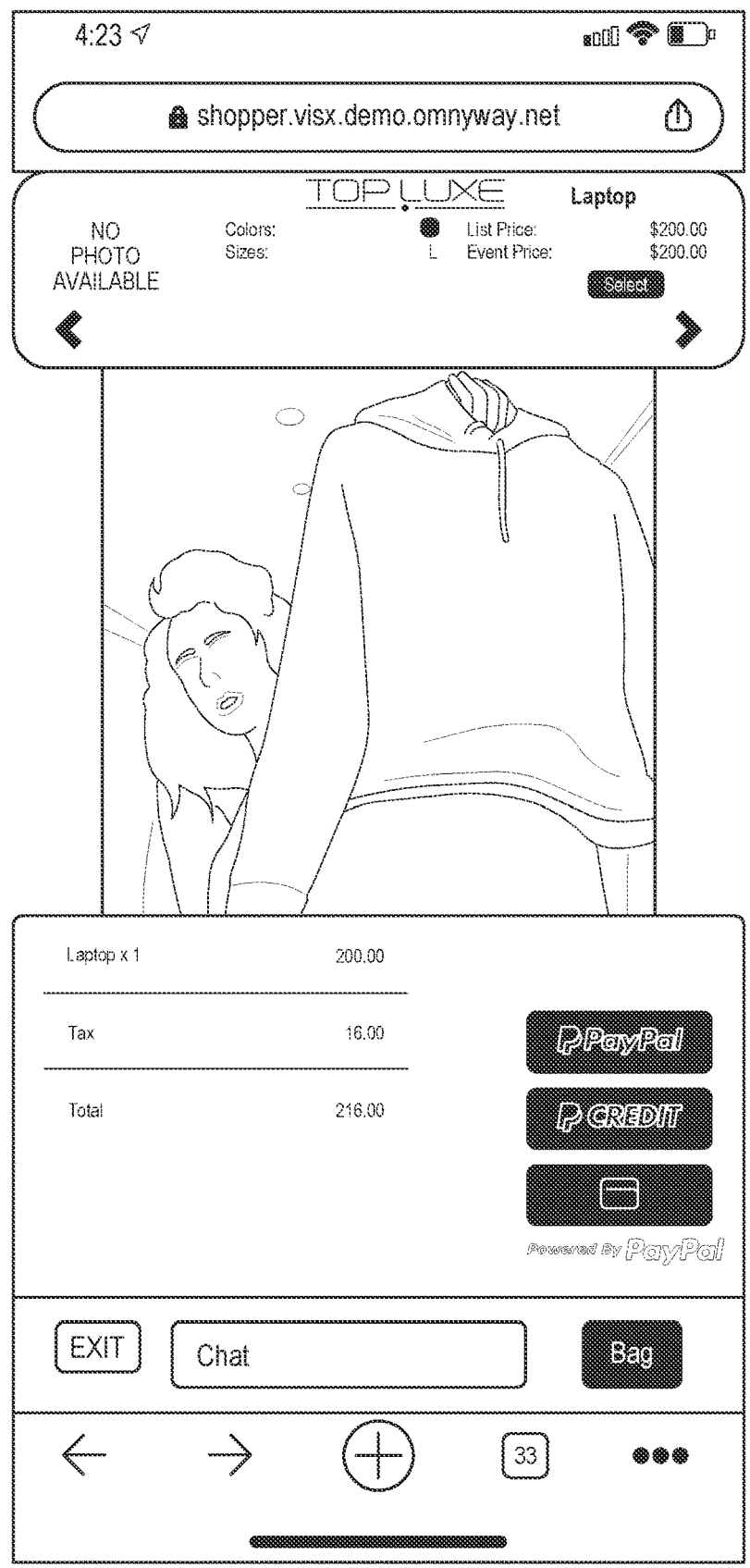

FIG. 6C illustrates the web page with a pop-up that provides transaction information such as total cost and payment options, which may be presented on the computing device responsive to the consumer interfacing with (e.g., clicking on) the "Bag" button.

Figure 6D:
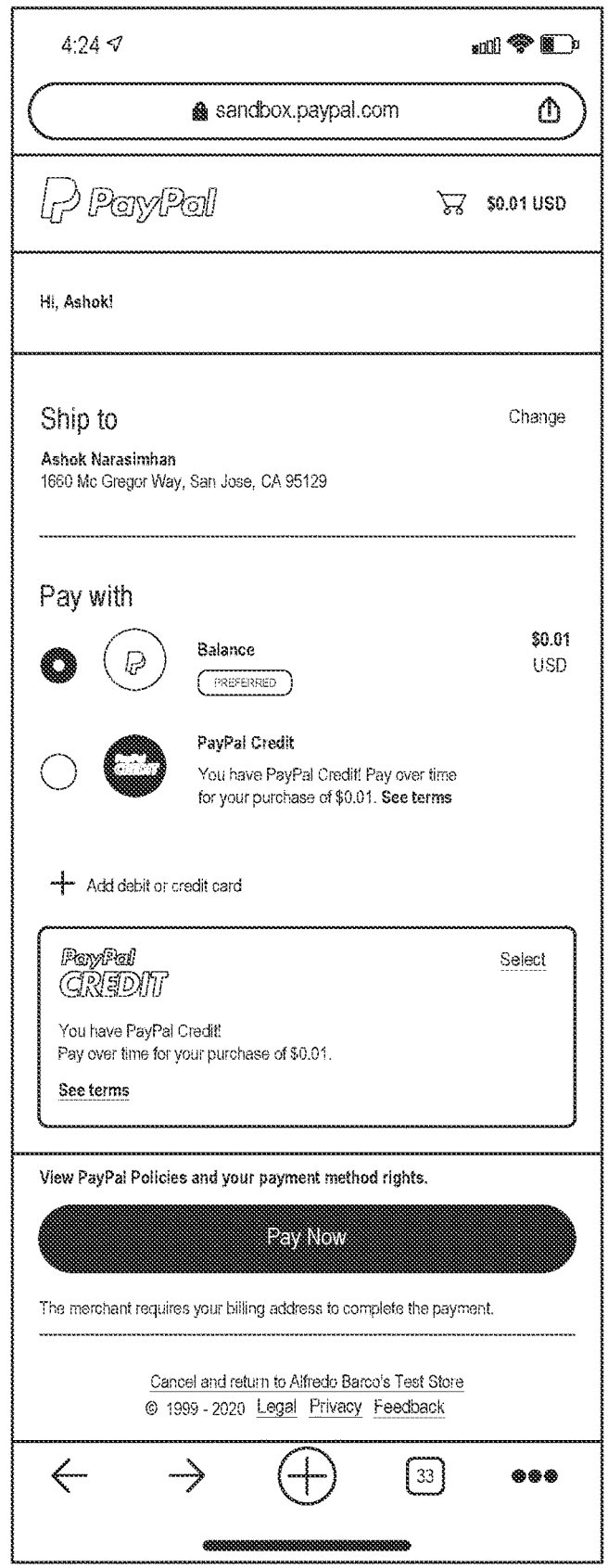

One of the illustrated payment options is to pay via a payment platform (e.g., such as PayPal®). FIG. 6D illustrates further payment details associated with a selected payment platform, and includes information such as shipping information and payment details, and includes an option to proceed with the transaction (e.g., make the payment).

Figure 6E:

FIG. 6E illustrates a screen shot of the web page showing confirmation that the transaction is complete (e.g., that the payment was successful). The consumer may then receive a confirmation message (e.g., text message and/or email).

Figure 7:
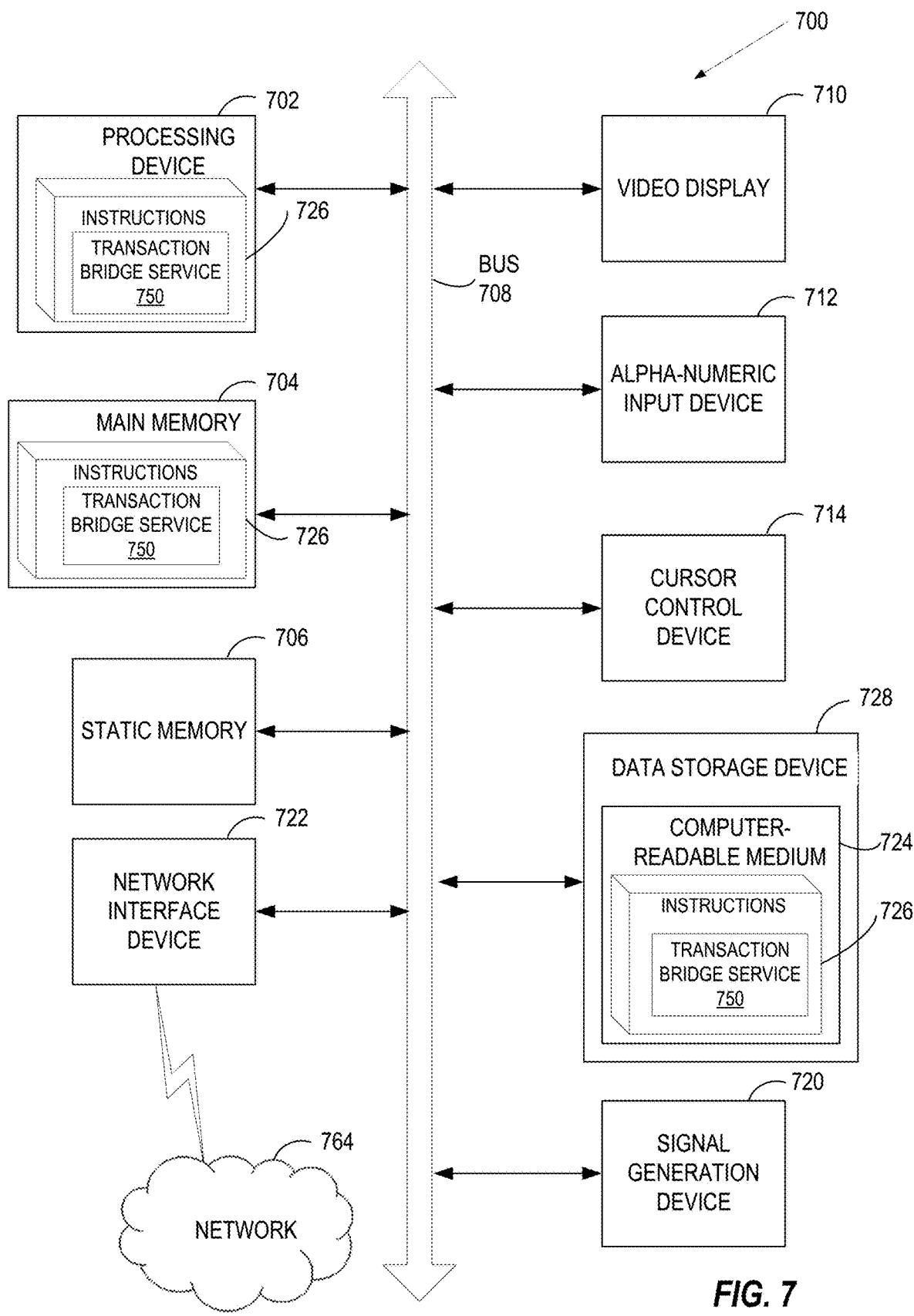
FIG. 7 illustrates a diagrammatic representation of a machine in the example form of a computing device within which a set of instructions, for causing the machine to perform any one or more of the methodologies discussed herein, may be executed.

FIG. 7 illustrates a diagrammatic representation of a machine in the example form of a computing device 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 728), which communicate with each other via a bus 708.

Processing device 702 represents one or more general-purpose processors such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the processing logic (instructions 726) for performing operations and steps discussed herein.

The computing device 700 may further include a network interface device 722 for communicating with a network 764. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 728 may include a machine-readable storage medium (or more specifically a non-transitory computer-readable storage medium) 724 on which is stored one or more sets of instructions 726 embodying any one or more of the methodologies or functions described herein. A non-transitory storage medium refers to a storage medium other than a carrier wave. The instructions 726 may also reside, completely or at least partially, within the main memory 704 and/or within the processing device 702 during execution thereof by the computer device 700, the main memory 704 and the processing device 702 also constituting computer-readable storage media.

The computer-readable storage medium 724 may also be used to store instructions for a transaction bridge service 750, which may perform the operations of the MBE 102, transaction bridge server 3, and/or transaction bridge system 30 described earlier. The computer readable storage medium 724 may also store a software library containing methods that call the instructions for the transaction bridge service 750. While the computer-readable storage medium 724 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present invention have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    receiving, from a merchant server associated with a merchant and by a transaction bridge server configured to facilitate a transaction between the merchant server and a mobile computing device of a user, transaction information for the transaction;
    generating, by the transaction bridge server, a uniform resource locator (URL) representing the transaction;
    sending, by the transaction bridge server, a message comprising the URL representing the transaction to the merchant server, wherein the merchant server is configured to display a touchpoint associated with the transaction for the mobile computing device of the user, wherein the mobile computing device does not use a mobile merchant application or a mobile payment application for the transaction, the touchpoint comprising the URL representing the transaction, wherein the message is configured to enable the mobile computing device to:
        capture the touchpoint containing the URL associated with the transaction;
        determine the URL from the captured touchpoint; and
        in response to capturing the touchpoint, automatically launch a web browser on the mobile computing device and send an URL request to the transaction bridge server;
    receiving the URL request from the web browser of the mobile computing device, the URL request comprising a request to access the generated URL representing the transaction;
    in response to receiving the URL request, generating a web page customized for the user, the web page comprising the transaction information;
    sending the web page to the web browser of the mobile computing device;
    receiving, from the web browser of the mobile computing device, an acceptance of the transaction; and
    initiating the transaction.

2. The method of claim 1, wherein the mobile computing device lacks an activated mobile payment application.

3. The method of claim 2, wherein the transaction information is received from the merchant server responsive to the user checking out at a point of sale (PoS) terminal of the merchant while the mobile computing device is at a physical location of the merchant.

4. The method of claim 2, wherein the touchpoint comprises a machine readable optical label, and wherein the URL request is received responsive to a camera of the mobile computing device scanning the machine readable optical label.

5. The method of claim 1, wherein the merchant server is a digital commerce platform server representing the merchant that is operated by an operator of the transaction bridge server.

6. The method of claim 1, wherein the transaction is completed without transmission of any sensitive information between the merchant server and the mobile computing device.

7. The method of claim 1, wherein the transaction is a payment transaction, and wherein initiating the payment transaction comprises:
    determining banking information of the user;
    sending the banking information and the transaction information to a payment processor;
    receiving a payment result from the payment processor, the payment result indicating that the payment transaction was successfully completed; and
    sending a receipt of the payment transaction to the mobile computing device, wherein the payment transaction is completed without the banking information being sent to the merchant server.

8. A system comprising:
    a transaction bridge server comprising a first memory and a first processing device, wherein the transaction bridge server is configured to facilitate a transaction between a merchant server associated with a merchant and a mobile computing device of a user, and wherein the first processing device is configured to execute instructions from the first memory to:
        receive, from the merchant server associated with the merchant, transaction information for the transaction between the user and the merchant;
        generate a uniform resource locator (URL) representing the transaction; and
        send a message comprising the URL representing the transaction to the merchant server, wherein the merchant server is configured to display a touchpoint associated with the transaction for the mobile computing device of the user, wherein the mobile computing device does not use a mobile merchant application or a mobile payment application for the transaction, the touchpoint comprising the URL representing the transaction, wherein the message is configured to enable the mobile computing device to:
            capture the touchpoint containing the URL associated with the transaction;
            determine the URL from the captured touchpoint; and
            in response to capturing the touchpoint, automatically launch a web browser on the mobile computing device and send an URL request to the transaction bridge server; and
    wherein the transaction bridge server is further configured to:
        receive the URL request from the web browser of the mobile computing device, the URL request comprising a request to access the generated URL representing the transaction;
        in response to receiving the URL request, generate a web page customized for the user, the web page comprising the transaction information;
        send the web page to the web browser of the mobile computing device;
        receive, from the web browser of the mobile computing device, an acceptance of the transaction; and
        initiate the transaction.

9. The system of claim 8, further comprising:
    the mobile computing device, comprising a second memory and a second processing device, wherein the second processing device is configured to execute instructions from the second memory to:

receive, from the transaction bridge server, the web page comprising the transaction information for the transaction;

display the web page using the web browser;

receive user acceptance of the transaction based on interaction with the displayed web page;

send the acceptance of the transaction to the transaction bridge server; and receive, from the transaction bridge server, a receipt indicating completion of the transaction.

10. The system of claim 8, wherein the mobile computing device lacks an activated mobile payment application.

* * * * *